United States Patent
Liu et al.

(10) Patent No.: US 9,850,616 B2
(45) Date of Patent: Dec. 26, 2017

(54) WASHING MACHINE DRIVING MECHANISM

(71) Applicant: CHANGZHOU MACHINE MASTER CO., LTD, Jiangsu (CN)

(72) Inventors: Xiaohui Liu, Jiangsu (CN); Yiming Hu, Jiangsu (CN); Chang Chen, Jiangsu (CN)

(73) Assignee: CHANGZHOU MACHINE MASTER CO., LTD, Luoyang Town Changzhou, Jiangsu (CN)

( * ) Notice: Subject to any disclaimer, the term of this patent is extended or adjusted under 35 U.S.C. 154(b) by 213 days.

(21) Appl. No.: 14/783,834

(22) PCT Filed: Nov. 13, 2013

(86) PCT No.: PCT/CN2013/001378
§ 371 (c)(1),
(2) Date: Dec. 9, 2015

(87) PCT Pub. No.: WO2014/166025
PCT Pub. Date: Oct. 16, 2014

(65) Prior Publication Data
US 2016/0108574 A1    Apr. 21, 2016

(30) Foreign Application Priority Data
Apr. 11, 2013 (CN) .......................... 2013 1 0124978

(51) Int. Cl.
*F16H 1/46* (2006.01)
*D06F 37/30* (2006.01)
(Continued)

(52) U.S. Cl.
CPC .............. *D06F 37/30* (2013.01); *F16H 1/28* (2013.01); *F16H 1/32* (2013.01); *F16H 1/46* (2013.01);
(Continued)

(58) Field of Classification Search
None
See application file for complete search history.

(56) References Cited

U.S. PATENT DOCUMENTS

| | | | | |
|---|---|---|---|---|
| 2,170,951 A | * | 8/1939 | Perry | F16H 1/32 475/159 |
| 2,382,482 A | * | 8/1945 | Henry | F16H 1/32 475/173 |

(Continued)

FOREIGN PATENT DOCUMENTS

| | | |
|---|---|---|
| CN | 2673911 Y | 1/2005 |
| CN | 2931935 Y | 8/2007 |

(Continued)

OTHER PUBLICATIONS

International Search Report dated Mar. 13, 2014 for PCT Application PCT/CN2013/001378 filed November.

*Primary Examiner* — Justin Holmes

(57) ABSTRACT

A washing machine driving mechanism includes a shaftless rotator (23) for generating rotational energy; a gear reduction mechanism (200) mounted on the rotator (23) and configured to obtain rotational energy from an eccentric position of the rotator (23) and output the energy with or without speed reduction; and a first driving part (11) connected with the gear reduction mechanism (200) and configured to supply the rotational energy with or without the speed reduction to respective execution parts of the washing machine. The rotator is a rotor of a motor, and an output rotating shaft on the rotor is canceled. The washing machine driving mechanism has a technical effect of being compact in structure and small in space occupancy.

7 Claims, 12 Drawing Sheets

(51) Int. Cl.
*F16H 1/28* (2006.01)
*F16H 1/32* (2006.01)
(52) U.S. Cl.
CPC ............... *F16H 2001/2881* (2013.01); *F16H 2001/323* (2013.01)

(56) References Cited

U.S. PATENT DOCUMENTS

| | | | | |
|---|---|---|---|---|
| 2,441,053 A * | 5/1948 | Wooster | .................. | D06F 13/02 68/133 |
| 3,352,176 A * | 11/1967 | Brundage | ............... | D06F 37/30 192/18 R |
| 4,317,343 A * | 3/1982 | Gerry | ...................... | D06F 37/40 192/18 R |
| 5,522,242 A * | 6/1996 | Hauser | ................... | D06F 37/40 192/12 BA |
| 2006/0010612 A1* | 1/2006 | Kim | ........................ | D06F 37/40 8/158 |
| 2013/0059693 A1* | 3/2013 | Fang | ......................... | F16H 1/32 475/180 |
| 2015/0159312 A1* | 6/2015 | Liu | ......................... | D06F 37/30 74/332 |

FOREIGN PATENT DOCUMENTS

| | | |
|---|---|---|
| CN | 101173469 A | 5/2008 |
| CN | 102660856 A | 9/2012 |
| CN | 202881700 U | 4/2013 |
| CN | 203270316 U | 11/2013 |
| JP | 2010-240006 A | 10/2010 |

\* cited by examiner

WASHING MACHINE DRIVING MECHANISM

FIELD OF THE INVENTION

The present invention relates to a driving mechanism with a gear reducer, and particularly to a washing machine driving mechanism.

BACKGROUND OF THE INVENTION

Motors have a variety of advantages, such as high energy, high conversion efficiency, energy saving, environmental protection and the like, thereby being widely used in industrial production and life. In electrical cars, electrical tricycles, electrical automobiles, washing machines and other apparatuses, the motors are essential apparatuses. The rotational speeds of general motors are higher, and in order to get appropriate output rotational speeds, the motors need to be decelerated in practical application. The common manner adopted at present is to connect the motor to a speed reducer to decelerate the speed through a primary belt pulley, and one or more levels of gear reducers are arranged in the speed reducer to reduce the speed at a certain speed reduction ratio. The structure is not only complex, but also is large in space occupancy. In order to solve this technical problem, some solutions of cancelling the belt pulley and directly connecting the motor with the speed reducer have been proposed at present. However since the motor body and the speed reducer are still relatively independent from each other, the motor body and the speed reducer need to occupy installation spaces respectively, so that the structure is not compact enough and the volume is still large.

To further solve the above-mentioned technical problem, a Chinese invention patent application with the publication number CN102142734A discloses an outer rotor motor assembly, including a motor body, a driving shaft and a transmission means, wherein the driving shaft is fixed on the transmission means, the motor body directly drives the driving shaft, the motor body is provided with an inner radial space, and the transmission means is mounted in the inner radial space of the motor body. Although this structure further reduces the occupied space to a certain extent, since the concept thereof is to install the transmission means in the inner radial space of a stator in an inner circumferential space of an outer rotor motor by a mounting part, the structure cannot be used in an inner-rotor type of motor without an inner space, resulting in some limitations. Meanwhile, because the motor body thereof is directly connected with the driving shaft and then the driving shaft is decelerated by the transmission means mounted in the inner radial space of the motor, the space occupancy is only reduced to a certain extent, but the structure is still not compact enough. Furthermore, when the volume of the transmission needs to be increased to obtain a larger transmission ratio, the present invention could be only achieved by increasing the inner radial volume of the outer rotor motor, and it is obvious that it does not solve the essential technical problem.

Therefore, how to propose a washing machine driving mechanism with a compact structure and small space occupancy is a technical problem to be solved by those skilled in the art at present.

SUMMARY OF THE INVENTION

The aim of the present invention is to provide a washing machine driving mechanism with a compact structure and small space occupancy.

A washing machine driving mechanism of the present invention for achieving the above-mentioned aim includes:
a shaftless rotator for generating rotational energy;
a gear reduction mechanism mounted on the rotator and configured to obtain rotational energy from an eccentric position of the rotator and output the energy with or without speed reduction; and
a first driving part connected with the gear reduction mechanism and configured to supply the rotational energy with or without the speed reduction to respective execution parts of the washing machine.

Preferably, the gear reduction mechanism includes:
an input gear shaft mounted at said position eccentric from an axis of the rotator and configured to revolve around said axis while the rotator rotates, so as to obtain the rotational energy therefrom;
an input gear connected with the input gear shaft and rotating relative to the rotator; and
an output gear engaged with the input gear;
wherein an output shaft serving as the first driving part is fixedly connected to the center of the output gear.

Preferably, the washing machine driving mechanism of the present invention further comprises a second driving part configured specially to output the rotational energy without speed reduction, wherein the second driving part is an output shaft sleeve which is sleeved on the output shaft and axially slidable.

Preferably, the gear reduction mechanism of the present invention further comprises an intermediate driving gear which is located outside the rotator and engaged with the input gear, and the intermediate driving gear is fixedly connected at its axial center with the output shaft sleeve.

In an embodiment of the present invention, an eccentric through hole for mounting the input gear shaft is formed in the position eccentric from the axis of the rotator, and the input gear shaft is rotatably mounted in the eccentric through hole. The input gear comprises a first input gear fixedly connected with an end of the input gear shaft and a second input gear fixedly connected with an opposite end of the input gear shaft. The second input gear is engaged with the output gear.

In another embodiment of the present invention, an end of the input gear shaft is fixedly or rotationally connected to the position eccentric from the axis of the rotator. The input gear comprises a first input gear and a second input gear which are fixedly connected with each other, wherein the axial centers of the first input gear and the second input gear are rotationally or fixedly connected with an opposite end of the input gear shaft respectively and wherein the second input gear is engaged with the output gear.

Preferably, the intermediate driving gear is an intermediate gear which is engaged with the first input gear and is sleeved on the output shaft, and the intermediate driving gear is configured to drive the first input gear to rotate through the interaction with the intermediate gear.

Preferably, the gear reduction mechanism of the present invention further comprises a clutch device engaged with the intermediate gear. When the clutch device axially slides to clutch the rotator, the output shaft sleeve is driven by the intermediate gear to rotate according to the rotational speed of the rotator.

Preferably, the rotator of the present invention is a rotor of a motor.

Compared with the prior art, the essential technical points of the present invention are as follows. It is proposed for the first time that the rotator of a power source, for example, a motor rotor or a belt pulley is used as a gear frame of a gear reducer. An input gear on the gear frame is connected and cooperated with the remaining parts of the gear reducer, and the output gear of the gear reducer is fixedly connected with the output shaft to achieve the deceleration output of the output shaft. Contrary to the manner in the prior art that "The rotor is fixedly connected with the output shaft and then the output shaft is decelerated by the gear reducer, and consequently the structure thereof is not compact enough, the space occupancy is large, and particularly, the axial size is larger", in the present invention, the rotator of the power source is used as one of the parts of the gear reducer at the same time, by which it truly achieves the integration of the motor and the gear reducer, greatly improves the structure compactness of the entire driving part, reduces the space occupancy, and particularly reduces the axial size. Meanwhile, since the structure is compact, the consumption of a large number of connecting pieces is avoided, and thus the production costs are further lowered.

It needs to be particularly noted that, for various fields applying motors, particularly the field of washing machines belonging to household appliances, how to improve the structure compactness and reduce the space occupancy of the motors and the speed reducers and how to lower the production cost are technical problems desired to be solved by those skilled in the art for all the time, and therefore, after a motor or a belt pulley combined with a gear reducer of the present invention is used in the field of household appliances, particularly used in the field of washing machines, very progressive significance is produced.

In addition, according to the present invention, it is proposed that the rotator of the power source, for example, the motor rotor or the belt pulley is used as the gear frame of the gear reducer. Those skilled in the art can combine the present invention with the existing technology relevant to a dual-power driving structure to obtain a novel dual-power washing machine driving mechanism with a more compact structure, smaller space occupancy and a smaller axial size in particular.

Meanwhile, in the present invention, relevant structures without literal description for the components, for example, a reinforcing rib structure, a connecting bearing, limitation for position, load bearing and other structures are common selections for those skilled in the art. Therefore no novelty or inventive step is produced after being combined with the present invention, and thus no illustration will be given herein.

DETAILED DESCRIPTION OF THE EMBODIMENTS

The core of the present invention is to provide a motor with a gear reducer, which is small in axial size, compact in structure and small in space occupancy.

For the purpose that those skilled in the art can better understand the solutions of the present invention, a further detailed description of the present invention will be given below in combination with the accompanying drawings and embodiments.

It should be noted that, such orientation words as upper, lower or the like involved herein are defined by positions of the parts and mutual positions of the parts in FIG. 1 to FIG. 15, and are only for the purpose of clear and convenient description of the technical solutions. It should be understood that, the orientation words used herein should not limit the scope claimed for protection by the application.

It should be noted that, structures or members with the same or similar functions in the embodiments of the present invention are indicated by the same reference numbers in the figures.

Reference may be made to FIGS. 1 to 9, a driving means comprises a gear reducer 200 and a power source, wherein a rotator of the power source is connected with a power input end of the gear reducer 200. A power output end of the gear reducer 200 is connected with a lower level load. For other relevant structures, please refer to any one of the first to the ninth embodiments of the motor with the gear reducer as described below.

Similarly, reference may be made to FIG. 1 to FIG. 9, a washing machine driving mechanism comprises a gear reducer 200 and a power source, wherein a rotator of the power source is connected with a power input end of the gear reducer 200, and a power output end of the gear reducer 200 is fixedly connected with a washing mechanism and a water containing mechanism respectively. The power input end of the gear reducer 200 is an input gear shaft of the gear reducer 200. The input gear shaft is eccentrically connected to the rotator of the power source. For other relevant structures, please refer to any one of the first to the ninth embodiments of the motor with the gear reducer as described below. For other relevant structures, please also refer to the description of an embodiment applying the ninth embodiment of the motor with the gear reducer of the present invention as a washing machine driving means in the field of washing machines.

Figure 1:
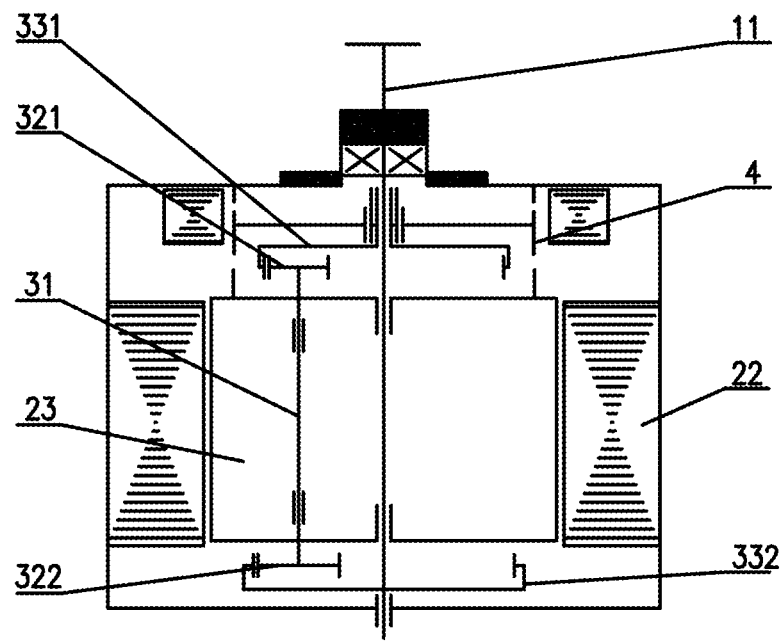
FIG. 1 is a schematic transmission diagram of a first embodiment of a motor with a gear reducer of the present invention.

With reference to FIG. 1, the power source is a motor 100, a rotor 23 of the motor 100 is used as the rotator of the power source to obtain the motor with the gear reducer. FIG. 1 shows a schematic transmission diagram of a first embodiment of the motor with the gear reducer. In the embodiment, the motor with the gear reducer comprises the motor 100, and the motor 100 is a motor 100 with an inner rotor and specifically comprises a motor housing (not indicated in the figure), a motor stator 22 and a motor rotor 23. The motor stator 22 is fixed on the motor housing. The motor rotor 23 is coaxially mounted inside the motor stator 22. A plurality of axle holes are formed on the motor rotor 23, and an upper end cover and a lower end cover are further arranged at the upper and lower ends of the motor rotor 23. The lower end cover, the motor stator 22 and the upper end cover may be fixed by locking screws. A mounting plate is further fixedly connected to the upper side of the upper end cover, and the motor with the gear reducer may be mounted on an external apparatus via the mounting plate.

The motor with the gear reducer further comprises an output shaft 11, and the output shaft 11 is concentrically arranged in the motor rotor 23. An oil bearing may be arranged between the output shaft 11 and the motor rotor 23. The output shaft 11 radially limits the motor rotor 23, and the relative rotation of the output shaft 11 and the motor rotor 23 is achieved by the oil bearing.

The motor with the gear reducer further comprises a gear reducer 200. The gear reducer 200 comprises an input gear shaft 31, a first gear 321, a second gear 322, an intermediate gear 331 and an output gear 332. The input gear shaft 31 is inserted into the axle hole of the motor rotor 23. An oil bearing is arranged between the input gear shaft 31 and the motor rotor 23, and the input gear shaft 31 and the motor rotor 23 may rotate relatively via the oil bearing. The first gear 321 and the second gear 322 are fixedly mounted at the opposite ends of the input gear shaft 31. The first gear 321 is engaged with the intermediate gear 331, and the second gear 322 is engaged with the output gear 332.

The intermediate gear 331 is sleeved on the output shaft 11 and is not fixed with the output shaft 11. The second gear 322 is fixedly connected with the output shaft 11 and may be fixedly connected via a cylindrical pin. A rolling bearing is further arranged between the output gear 332 and the lower end cover to achieve the relative rotation of the output gear 332 and the lower end cover and to limit the axial and radial movements of the output gear 332 at the same time.

It should be noted herein that, a plurality of input gear shafts and first gears and second gears matched with the same may be inserted into the rotor of the motor 100. The rotor of the motor 100 preferably comprises 2-4 axle holes, and the plurality of input gear shafts may be arranged to ensure better stability when a combination of the motor 100 and the gear reducer 200 is at work. Of course, it is also possible that only one gear shaft and a matched gear are inserted into the rotor of the motor 100.

When operated according to the embodiment, after being energized, the motor 100 drives the motor rotor 23 to rotate and simultaneously drives the input gear shaft 31 connected with the motor rotor 23 and the first gear 321 and the second gear 322 fixedly mounted on the input gear shaft 31 to revolve. The intermediate gear 331 and the first gear 321 are engaged and have tooth difference, thereby capable of simultaneously driving the input gear shaft 31 to rotate. The second gear 322 is engaged with the output gear 332 to drive the output gear 332 to rotate and finally drive the output shaft 11 fixedly connected with the output gear 332 to rotate. Since the first gear 321, the second gear 322, the intermediate gear 331 and the output gear 332 have a tooth difference relationship, a rotational speed difference will be generated between the output gear 332 and the motor rotor 23 to drive the output shaft 11 to output a lower speed.

It should be noted herein that, the tooth difference relationship of the first gear 321, the second gear 322, the intermediate gear 331 and the output gear 332 may be adjusted and determined according to an actually necessary reduction ratio.

In the embodiment, both of the intermediate gear 331 and the output gear 332 are inner gear rings.

Embodiments as shown in FIG. 2 to FIG. 10 are embodiments when the power source is a motor 100, and a rotor 23 of the motor 100 is used as a rotator of the power source to obtain a motor with a gear reducer.

Figure 2:
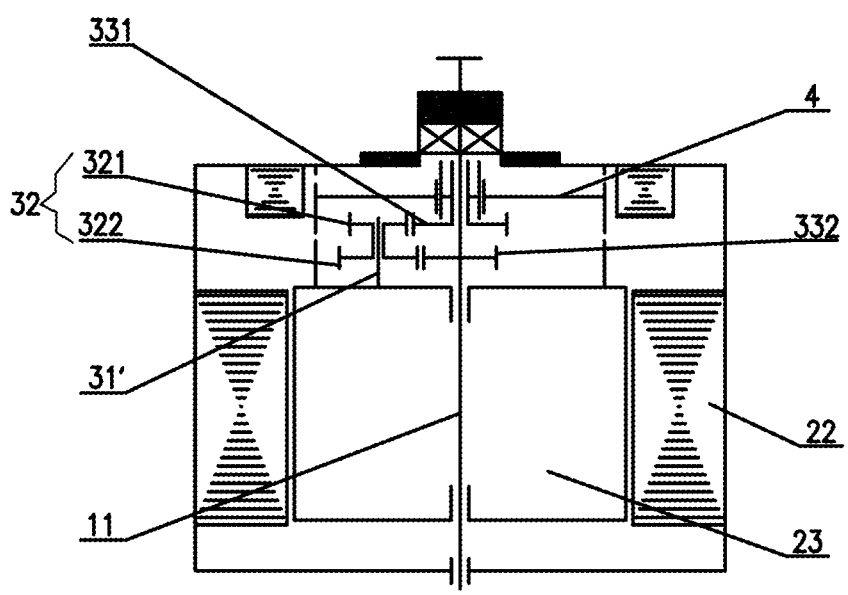
FIG. 2 is a schematic transmission diagram of a second embodiment of a motor with a gear reducer of the present invention.

With reference to FIG. 2, in the second embodiment, a gear reducer 200 comprises a duplex gear 32, an intermediate gear 331 and an output gear 332. The duplex gear 32 is sleeved on an input gear shaft 31', the intermediate gear 331 and the output gear 332 are respectively engaged with a first level gear 321 and a second level gear 322 of the duplex gear 32. The intermediate gear 331 is sleeved on an output shaft 11 and is not fixed with the output shaft 11, and the second gear 322 is fixedly connected with the output shaft 11, wherein both of the intermediate gear 331 and the output gear 332 are outer gears.

In the second embodiment, the input gear shaft 31' is fixedly inserted into the motor rotor 23, the duplex gear 32 and the input gear shaft 31' may rotate relatively. When the motor rotor 23 is driven to rotate, the duplex gear 32 is simultaneously driven to revolve and rotate, and the purpose of lower speed output of the output shaft 11 may also be achieved by the tooth difference relationship of the first level gear 321 and the second level gear 322 of the duplex gear 32 with the intermediate gear 331 and the output gear 332.

Of course, the input gear shaft 31' may also be rotationally connected with the motor rotor 23, and the duplex gear 32 is fixedly connected with the input gear shaft 31', in order to achieve the lower speed output of the output shaft 11 as well.

In the second embodiment or the foregoing first embodiment, the intermediate gear 331 may be an outer gear or an inner gear ring. The output gear 332 may be an outer gear or an inner gear ring. Thus the gear reducer 200 may have the following several different embodiments.

Figure 3:
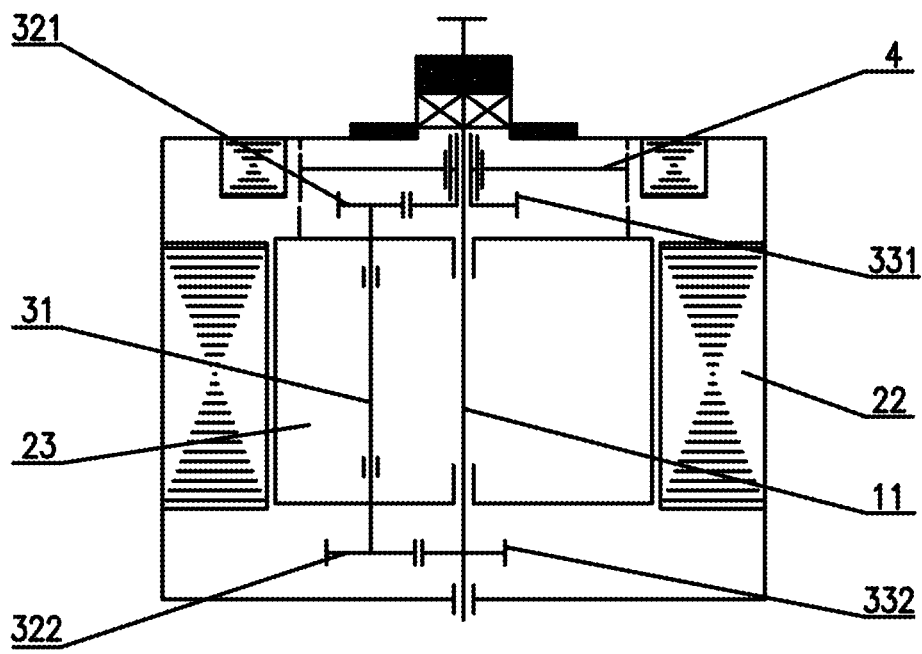
FIG. 3 is a schematic transmission diagram of a third embodiment of a motor with a gear reducer of the present invention.

With reference to FIG. 3, in the third embodiment, an input gear shaft 31 is rotationally inserted into a motor rotor 23, and a first gear 321 and a second gear 322 are fixedly mounted at the opposite ends of the input gear shaft 31, wherein both of the intermediate gear 331 and the output gear 332 are outer gears.

Figure 4:
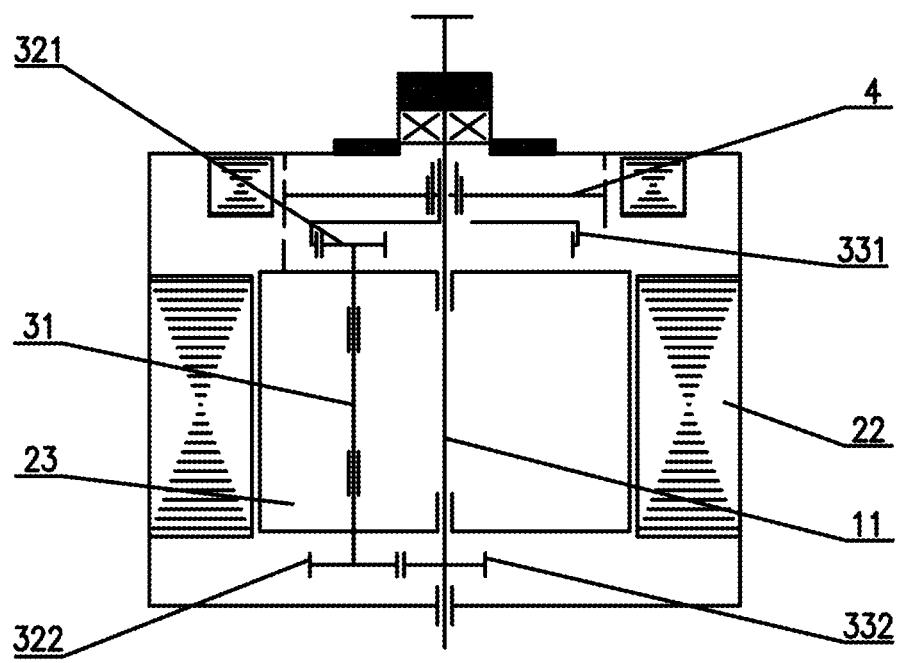
FIG. 4 is a schematic transmission diagram of a fourth embodiment of a motor with a gear reducer of the present invention.

With reference to FIG. 4, in the fourth embodiment, an input gear shaft 31 is rotationally inserted into a motor rotor 23, and a first gear 321 and a second gear 322 are fixedly mounted at the opposite ends of the input gear shaft 31, wherein the intermediate gear 331 is an inner gear ring, and the output gear 332 is an outer gear.

Figure 5:
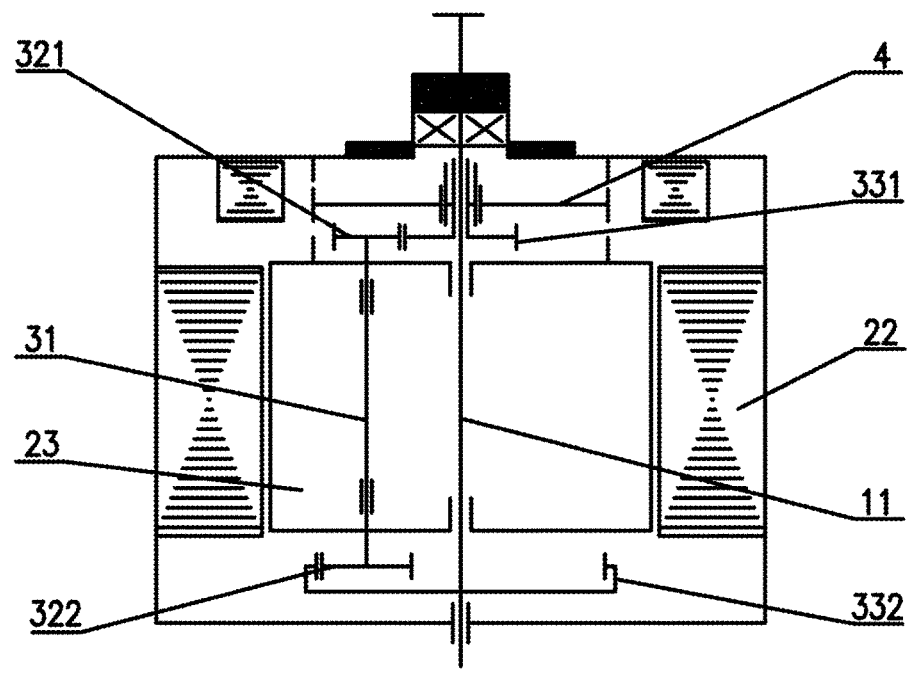
FIG. 5 is a schematic transmission diagram of a fifth embodiment of a motor with a gear reducer of the present invention.

With reference to FIG. 5, in the fifth embodiment, an input gear shaft 31 is rotationally inserted into a motor rotor 23, and a first gear 321 and a second gear 322 are fixedly mounted at the opposite ends of the input gear shaft 31, wherein the intermediate gear 331 is an outer gear, and the output gear 332 is an inner gear ring.

Figure 6:
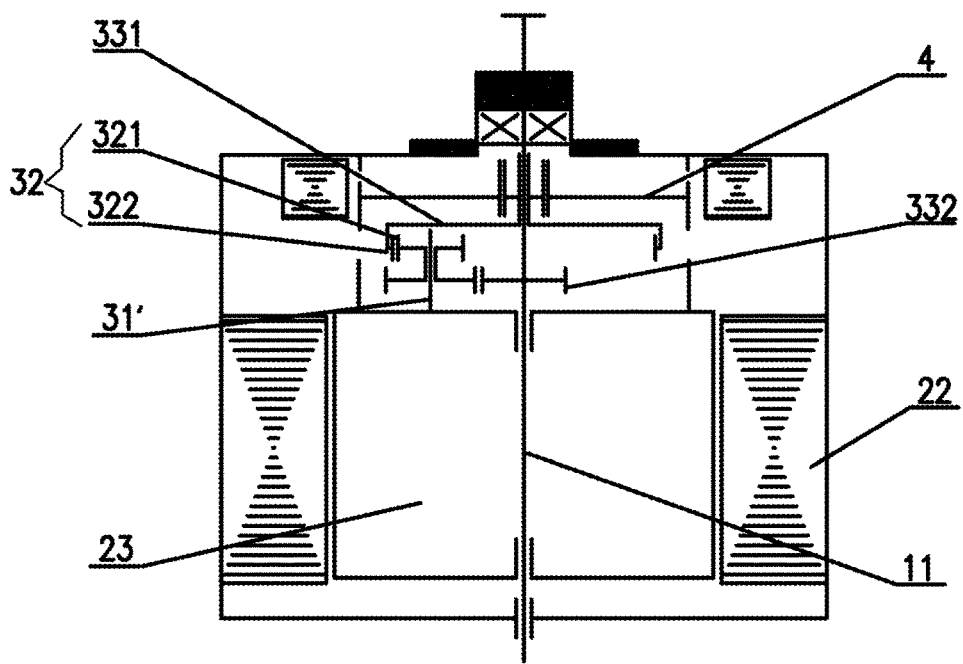
FIG. 6 is a schematic transmission diagram of a sixth embodiment of a motor with a gear reducer of the present invention.

With reference to FIG. 6, in the sixth embodiment, an input gear shaft 31' is fixedly connected with a motor rotor 23. A duplex gear 32 and an input gear shaft 31' may rotate relatively, and an intermediate gear 331 and an output gear 332 are respectively engaged with a first level gear 321 and a second level gear 322 of the duplex gear 32, wherein the intermediate gear 331 is an inner gear ring, and the output gear 332 is an outer gear.

Figure 7:
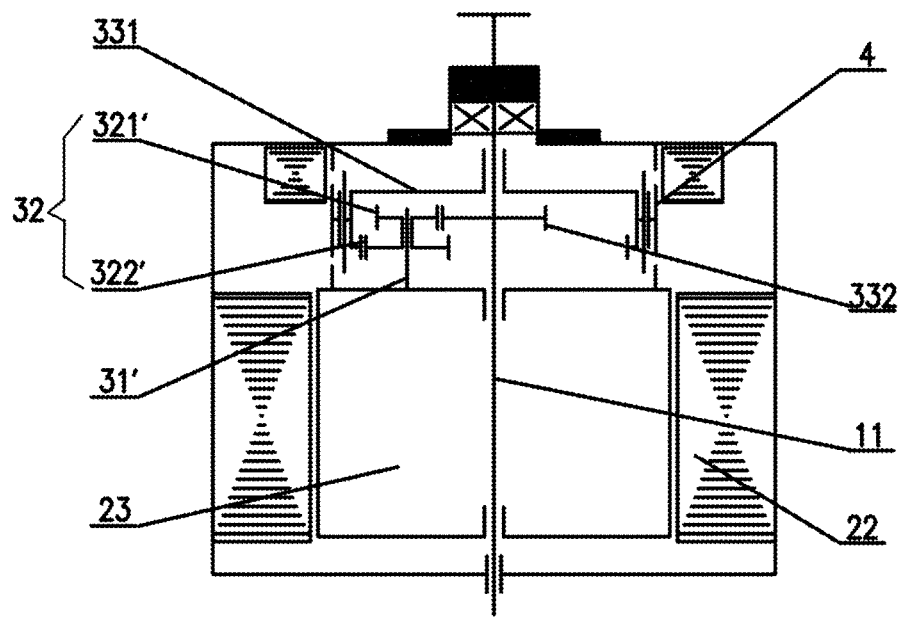
FIG. 7 is a schematic transmission diagram of a seventh embodiment of a motor with a gear reducer of the present invention.

Since the tooth numbers of the two levels of gears of the duplex gear 32 are different, the first level gear 321' of the duplex gear 32 may be engaged with the output gear 332 and the second level gear 322' may be engaged with the intermediate gear 331 The intermediate gear 331 is still an inner gear ring, and the output gear 332 is still an outer gear. This is the seventh embodiment, as shown in FIG. 7.

The transmission principles in the operation processes of the several above-mentioned embodiments are the same as that in the first embodiment, and will not be repeated redundantly herein.

It should be noted that, besides the several above-mentioned embodiments, the gear reducer 200 obviously may have other embodiments, as long as differential deceleration could be achieved to generate a rotational speed difference between the output shaft and the rotor of the motor 100.

In practice, some external apparatuses require different rotational speeds of the output shaft at different operation conditions. For example, a washing machine requires a lower speed output of the output shaft at a washing operation condition, and it requires a higher speed output of the output shaft at a spin-drying operation condition to completely remove the water from the washing. In order to meet the demands of different operation conditions of the external apparatuses, the above-mentioned motor with the gear reducer may be further improved.

Furthermore, the motor with the gear reducer further comprises a clutch mechanism 4, and the clutch mechanism 4 is arranged between the gear reducer 200 and the motor rotor 23 to switch between a lower speed output and a higher speed output.

The clutch mechanism 4 may be an electromagnetic clutch mechanism or a mechanical clutch mechanism. An illustration will be given below with the electromagnetic clutch mechanism as an example.

For the specific electromagnetic clutch mechanism, please refer to the electromagnetic clutch mechanism disclosed by the present applicant in a previous application with the application number CN201210084877.4. Meanwhile, the connection relation of the electromagnetic clutch mechanism with other parts may be as follows: a clutch gear ring of the electromagnetic clutch mechanism may be engaged in axial slidable connection with the intermediate gear 331, the mounting plate is used as an upper engagement part, and the rotor is used as a lower engagement part.

It should be noted herein that, the clutch gear ring and the intermediate gear 331 are at an engagement state at any operation condition and cannot generate relative rotation therebetween. After the electromagnetic clutch mechanism is energized, the clutch gear ring may overcome the spring force of a spring to slide upwards in the axial direction via the intermediate gear 331, so as to clutch the clutch gear ring with the mounting plate. At this time, after being energized, the motor 100 may achieve the lower speed output of the output shaft 11 by the gear reducer 200. After the electromagnetic clutch mechanism is de-energized, under the action of a restoring spring force of the spring, the clutch gear ring slides downwards in the axial direction via the intermediate gear 331, so as to disengage the clutch gear ring from the mounting plate and meanwhile clutch the former with the motor rotor 23. The gear reducer 200 locks itself, and at this time, after the motor 100 is energized, the output shaft 11 and the motor rotor 23 rotate at the same speed to achieve a higher speed output.

In the operation process, when the motor rotor 23 and the output shaft 11 rotate, friction is generated inevitably, and in order to reduce the abrasion, a plain bearing may be arranged between the motor rotor 23 and the output shaft 11 to relieve the rotational abrasion between the motor rotor 23 and the output shaft 11 and prolong the service lives.

The above-mentioned motor with the gear reducer may also be further improved.

Furthermore, the motor with the gear reducer further comprises an output shaft sleeve 12, which is sleeved on the output shaft 11. An oil bearing may be arranged between the output shaft sleeve 12 and the output shaft 11, so that the output shaft sleeve 12 and the output shaft 11 may rotate relatively.

Figure 8:
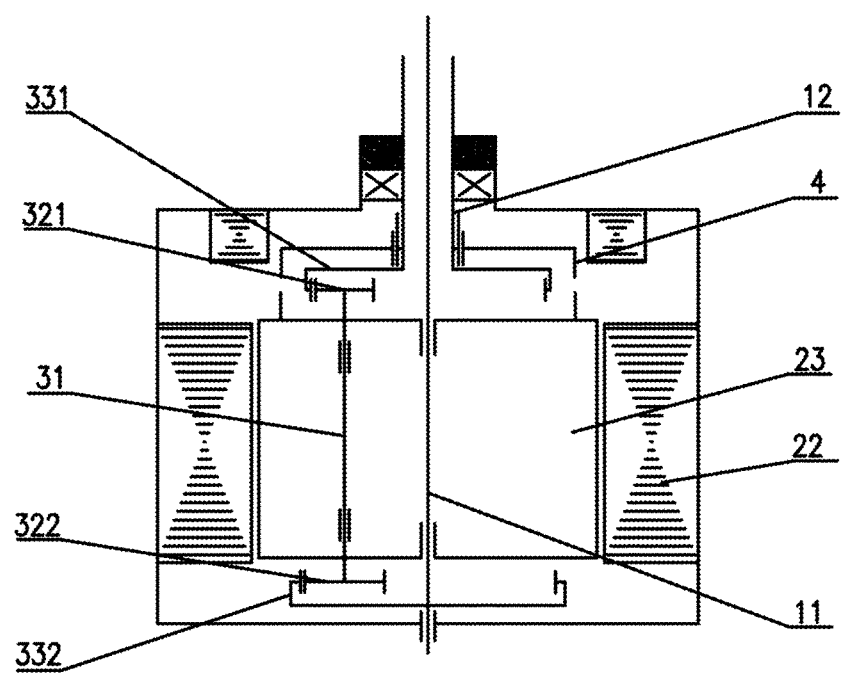
FIG. 8 is a schematic transmission diagram of an eighth embodiment of a motor with a gear reducer of the present invention.

With reference to FIG. 8, FIG. 8 is a schematic transmission diagram of a motor with a gear reducer, on which an output shaft sleeve is mounted. In the eighth embodiment, a gear reducer 200 comprises an input gear shaft 31 inserted into a motor rotor 23, and a first gear 321 and a second gear 322 which are fixedly mounted at the opposite ends of the input gear shaft 31. The first gear 321 is engaged with an intermediate gear 331, and the second gear 322 is engaged with an output gear 332. The output gear 332 is fixedly connected with an output shaft 11. Both of the intermediate gear 331 and the output gear 332 are inner gear rings.

The intermediate gear 331 is fixedly connected with an end of the output shaft sleeve 12. The clutch mechanism 4 is arranged between the output shaft sleeve 12 and the motor rotor 23, and specifically, the clutch gear ring of the clutch mechanism 4 may be engaged in axial slidable connection with the intermediate gear 331, or be engaged in axial slidable connection with the output shaft sleeve 12 through a spline sleeve. It should be noted that, no matter whether the clutch gear ring is connected with the output shaft sleeve 12 through the intermediate gear 331 or the spline sleeve, the clutch gear ring is engaged with the intermediate gear 331 or the spline sleeve and cannot rotate relatively at any operation condition. When the clutch mechanism is energized or de-energized, the clutch gear ring may be clutched or disconnected with the motor rotor 23.

When the clutch gear ring is clutched with the motor rotor 23, the intermediate gear 331 is locked with the motor rotor 23, so that the gear reducer 200 locks itself. And the output shaft 11, the gear reducer 200, the output shaft sleeve 12 and the motor rotor 23 output at the same rotational speed.

When the clutch gear ring is disconnected with the motor rotor 23, the clutch gear ring may be clutched with a fixing member of the motor 100, for example, the mounting plate, so that the output shaft sleeve 12 connected with the clutch mechanism 4 is in a fixed state, and the output shaft 11 may achieve a lower speed output through the gear reducer 200.

At this time, the clutch gear ring may also be not clutched with the fixing member of the motor 100, so that the clutch gear ring is in an unfixed state. The output shaft sleeve 12 connected with the clutch gear ring is in the unfixed state as well. The output shaft 11 achieves a lower speed output, and the output shaft sleeve 12 also achieves a lower speed output at a certain speed ratio, namely, a hybrid power output may be realized. It should be noted herein that, the speed outputs of the output shaft 11 and the output shaft sleeve 12 may be unidirectional or in two opposite directions. The rotating directions of the output shaft 11 and the output shaft sleeve 12 could be the same or reverse, which depends on a positive or negative value of a tooth difference ratio of the gear reducer 200. In practice, the tooth difference relationship of the gear reducer 200 may be set according to demands.

It should be still noted herein that, in the eighth embodiment, the gear reducer 200 of the motor with the gear reducer having the output shaft sleeve may also be embodied as shown in FIG. 1 to FIG. 7. Specifically, for example, the intermediate gear 331 and the output gear 332 may be an inner gear ring and an outer gear, or vice versa. The first gear 321 and the second gear 322 may be replaced by the duplex gear to achieve the same functions.

Furthermore, when the motor with the gear reducer according to the eighth embodiment is used as a washing machine driving means in the field of washing machines, the output shaft 11 in the above embodiments may be used as a washing shaft of the washing machine, and the output shaft sleeve 12 serves as a spin-drying shaft of the washing machine. The washing and spin-drying operation conditions are switched by the clutch mechanism 4, specifically as follows:

When the clutch gear ring is disconnected with the motor rotor 23, the clutch gear ring may be clutched with a fixing member of the motor 100, for example, a mounting plate, so that the output shaft sleeve 12 connected with the clutch gear ring is in a fixed state, and the output shaft 11 may achieve a lower speed output through the gear reducer 200, namely, achieve a single drive manner of the washing machine. The clutch gear ring may also be not clutched with the fixing member of the motor 100, so that the clutch gear ring is in an unfixed state. The output shaft sleeve 12 connected with the clutch gear ring is in the unfixed state as well. The output shaft 11 achieves a lower speed output, and meanwhile the output shaft sleeve 12 also achieves a lower speed output at a certain speed ratio, namely a hybrid power output is realized. That is, it achieves a constant power drive manner of the washing machine to fulfill a washing function.

When the clutch gear ring of the clutch mechanism 4 is clutched with the motor rotor 23, the intermediate gear 331 is locked with the motor rotor 23, so that the gear reducer 200 locks itself, and the output shaft 11, the gear reducer 200, the output shaft sleeve 12 and the motor rotor 23 output at the same rotational speed to fulfill a spin-drying function.

Figure 9:
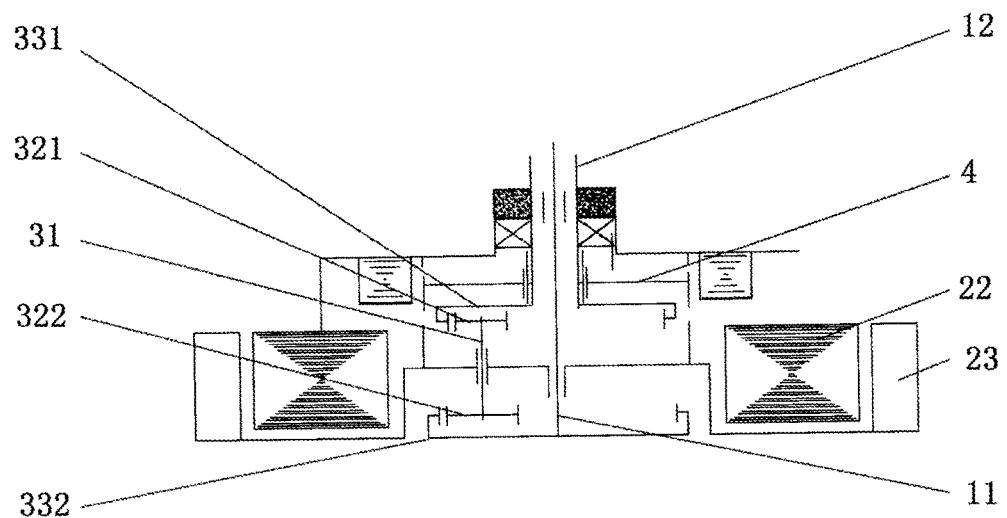
FIG. 9 is a schematic transmission diagram of a ninth embodiment of a motor with a gear reducer of the present invention.

Furthermore, in the above-mentioned embodiments, the motor is an inner-rotor type of motor 100 with the gear reducer 200. Of course, the present invention may further comprise an embodiment including an outer-rotor type of motor 100 with the gear reducer 200. With reference to FIG. 9, FIG. 9 is a schematic transmission diagram of a ninth embodiment of a motor with a gear reducer of the present invention. In the embodiment, the motor with the gear reducer comprises a body of the motor 100 of the outer rotor type. The outer rotor motor specifically comprises a motor stator 22 and a motor rotor 23 coaxially arranged outside the motor stator 22. For other relevant structures, please refer to the eighth embodiment. And meanwhile, the gear reducer 200 may also be the same as any one of the first to the seventh embodiments of the present invention.

Figure 10:
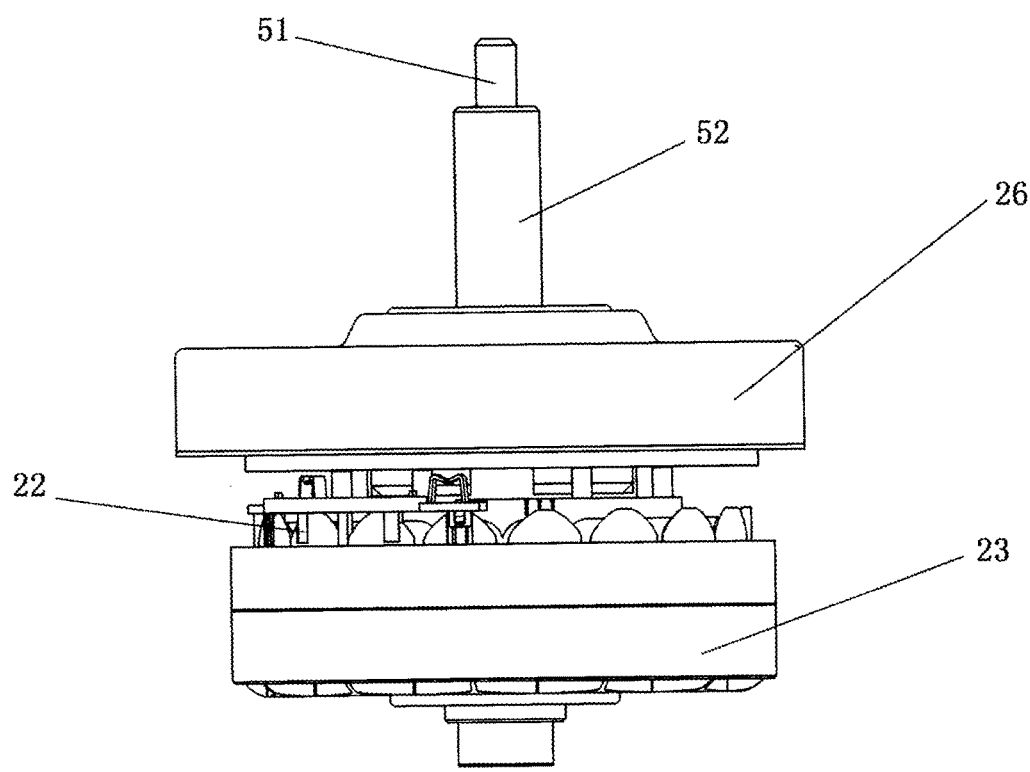
FIG. 10 is a schematic structural perspective view applying the ninth embodiment of the motor with the gear reducer of the present invention as a washing machine driving means in the field of washing machines.
Figure 11:
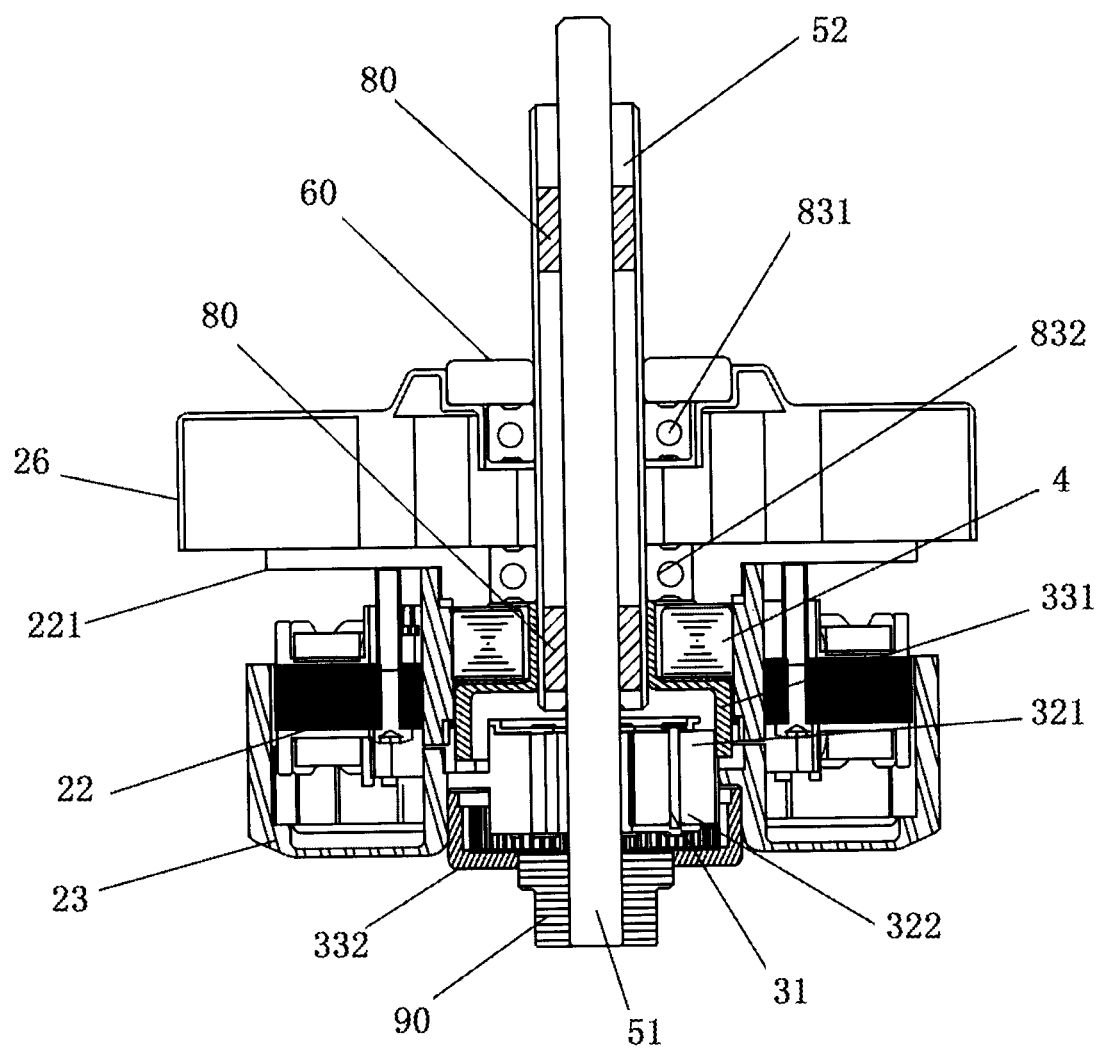
FIG. 11 is a sectional view of FIG. 10.
Figure 12:
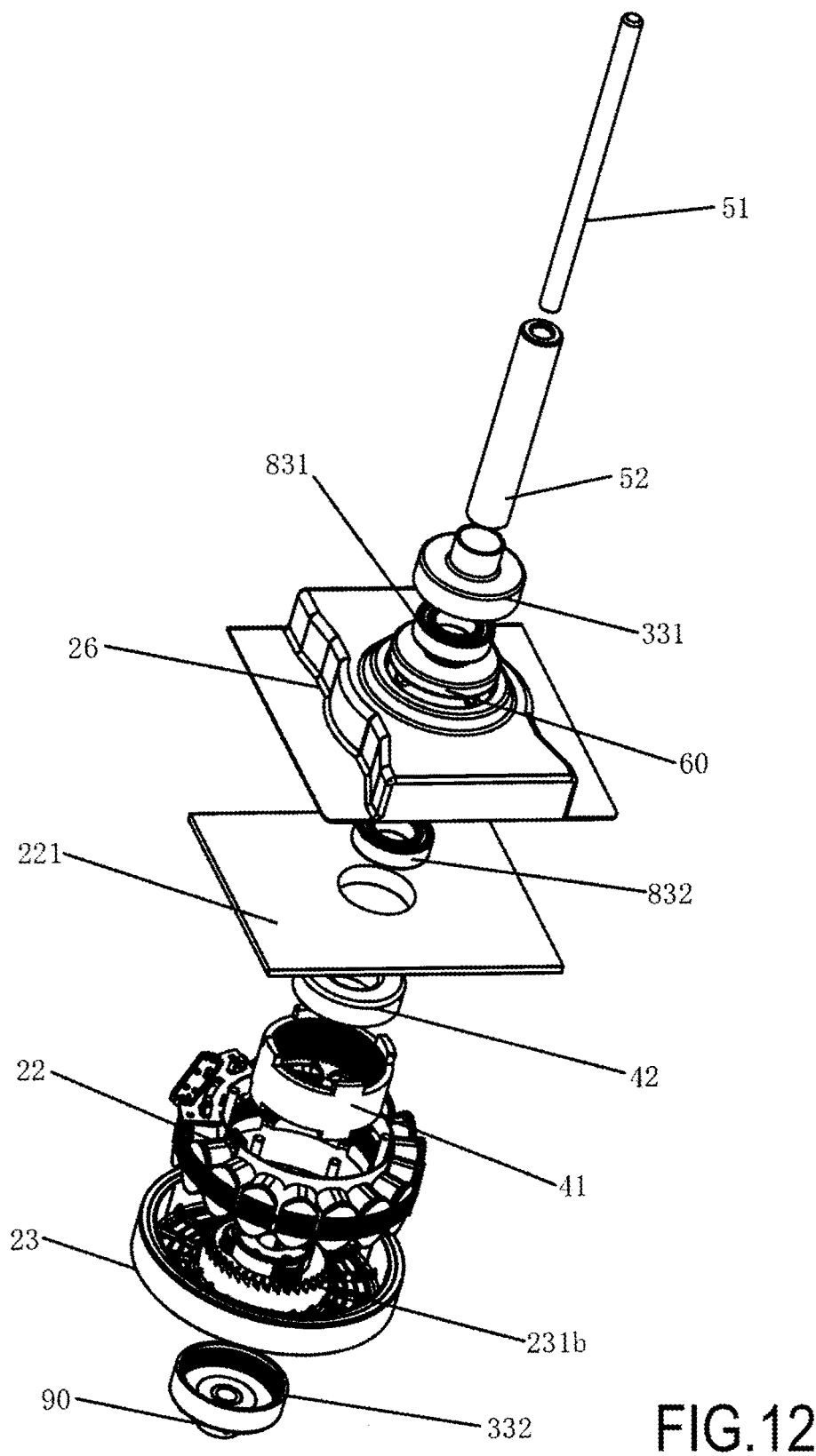
FIG. 12 is an exploded partial perspective view of FIG. 10.

Furthermore, the ninth embodiment and any embodiments changed according to the first to the eighth embodiments may also be used as the washing machine driving means in the field of washing machines. The output shaft 11 in the embodiments is used as a washing shaft 51 of the washing machine, and the output shaft sleeve 12 serves as a spin-drying shaft 52 of the washing machine. With the ninth embodiment as an example as well, specific reference may be made to FIG. 10, FIG. 11 and FIG. 12, wherein FIG. 10 is a schematic structural perspective view applying the ninth embodiment of the motor with the gear reducer of the present invention as the washing machine driving means in the field of washing machines, FIG. 11 is a sectional view of FIG. 10, and FIG. 12 is an partial exploded perspective view (namely, parts are only incompletely exploded) of FIG. 10. In the embodiment, the motor with the gear reducer comprises a body of the motor 100 that is an outer-rotor type of motor 100 specifically comprising a motor stator 22 and a motor rotor 23. The motor rotor 23 is coaxially arranged outside the motor stator 22. A plurality of axle holes are formed on the motor rotor 23. The upper side of the motor stator 22 is fixedly connected with a mounting plate 26 through a stator mounting disk 221. The fixed connection may be a screw fastening connection or other fixed connections. The motor with the gear reducer may be mounted on the washing machine via the mounting plate 26, or the motor stator 22 is fixedly connected with the mounting plate 26 directly, and then the above-mentioned driving means is mounted on the washing machine through the mounting plate 26.

Figure 13:
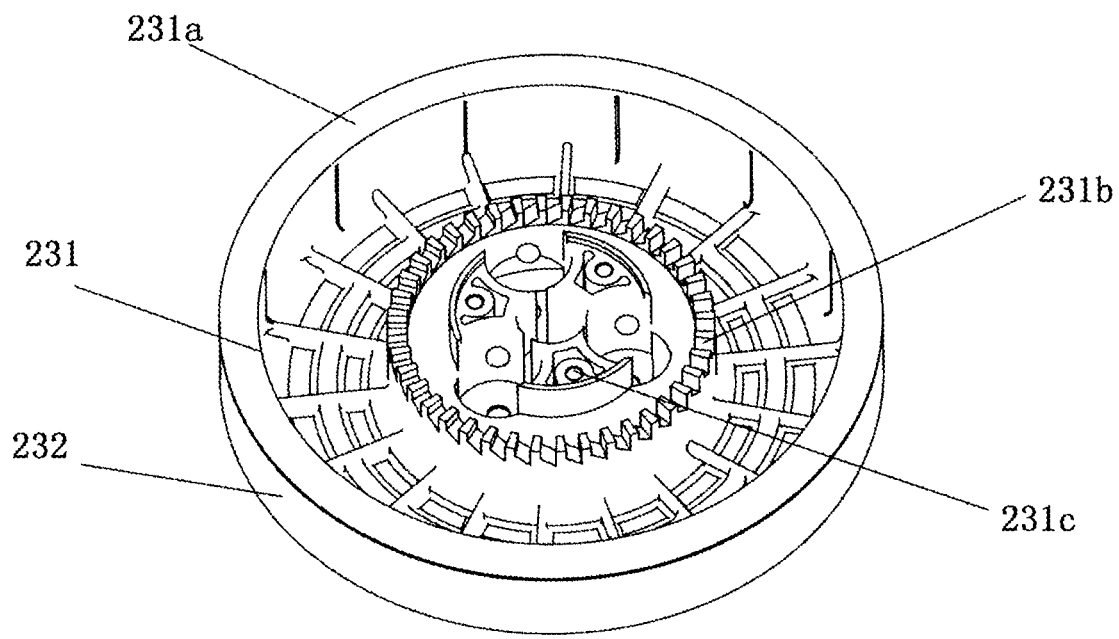
FIG. 13 is a schematic structural perspective view of a motor rotor 23 as shown in FIG. 10, FIG. 11 and FIG. 12.
Figure 14:
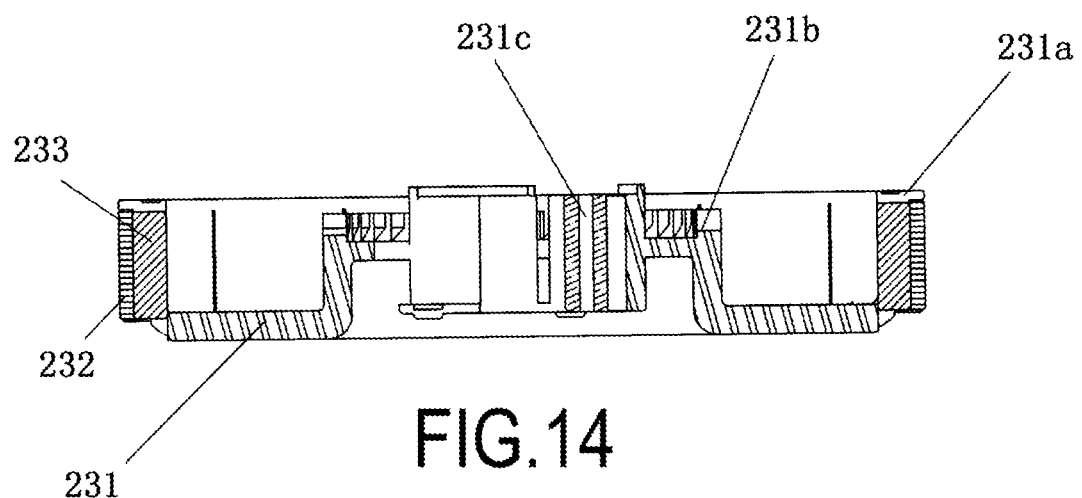
FIG. 14 is a sectional view of FIG. 13.
Figure 15:
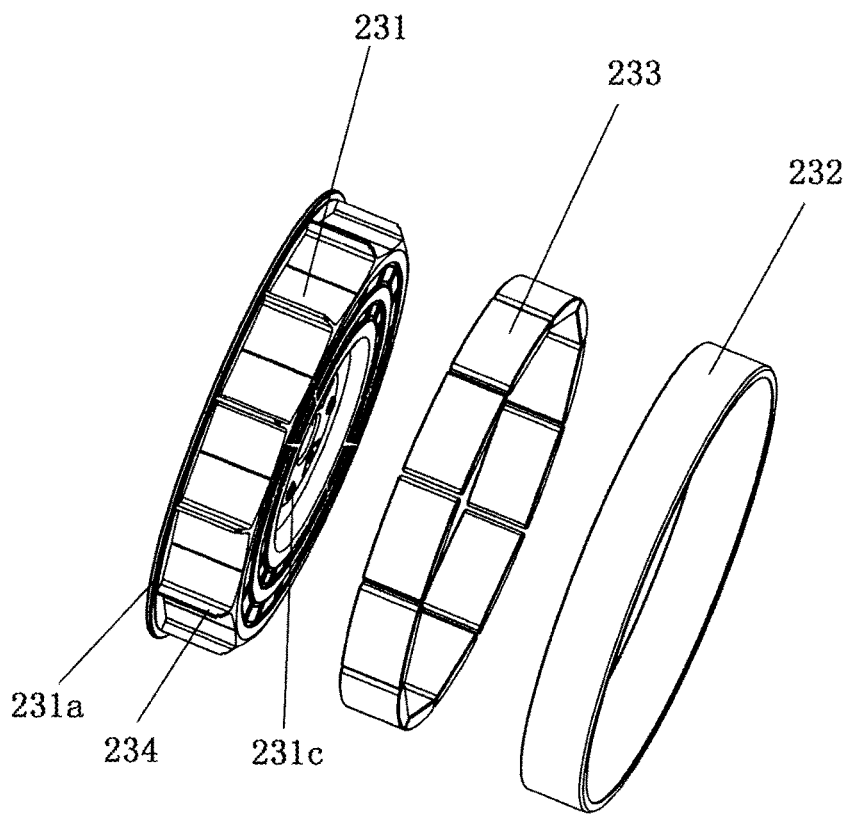
FIG. 15 is an exploded structural perspective view of FIG. 13.

For the motor rotor 23, please refer to FIG. 13, FIG. 14 and FIG. 15, which specifically include: the motor rotor 23 is an outer rotor, which specifically comprises a rotor housing 231, a magnetic yoke 232 and multiple permanent magnetic steel 233, wherein the permanent magnetic steel 233 is uniformly and fixedly arranged on the outside wall of the rotor housing 231 at intervals, and the magnetic yoke 232 is located outside the permanent magnetic steel 233 and is fixedly connected with the rotor housing 231; an end of a side face of the rotor housing 231 includes an extension side 231a, and the extension side 231a facilitates the adhesion procedure operation of the permanent magnetic steel; the rotor housing 231 is of an integrally cast aluminum structure; a plurality of permanent magnetic steel positioning spacers 234 are further integrally arranged on the outside wall of the rotor housing 231 for uniformly distributing the permanent magnetic steel 233 on the rotor housing 231 at intervals, and the permanent magnetic steel positioning spacers 234 are integrally formed with the rotor housing through cast aluminum at the same time; an axle hole 231c in insertion fit with the input gear shaft 31 of the gear reducer 200 is formed on the rotor housing 231; 1-10 axle holes 231c are formed, and 2-5 axle holes 231c are preferred; the curvature radius of the permanent magnetic steel 233 close to the middle of the side face of the rotor housing 231 is larger than the curvature radiuses of the two opposite ends thereof, namely, a circular arc-shaped projection is formed at a position close to the middle of the side face of the rotor housing 231 of the permanent magnetic steel 233. In the embodiment, the assembly method of the motor rotor 23 may be as follows: at first, the permanent magnetic steel 233 is uniformly and fixedly adhered on the outside wall of the rotor housing 231 at intervals; then the magnetic yoke 232 is covered at the outside of the permanent magnetic steel 233, and meanwhile, the magnetic yoke 232 is fixedly connected with the rotor housing 231. The rotor housing 231 is fixedly connected with the magnetic yoke 232 through a chase mortise cooperation mechanism, and of course, other fixed connection manners may also be adopted.

The washing shaft 51 of the washing machine is coaxially mounted in the motor rotor 23. A rotor oil bearing (not shown in the figure) is arranged between the washing shaft 51 and the motor rotor 23. The washing shaft 51 radially limits the motor rotor 23, and the relative rotation of the washing shaft 51 and the motor rotor 23 is achieved by the rotor oil bearing.

The spin-drying shaft 52 of the washing machine is sleeved on the washing shaft 51. A washing shaft oil bearing 80 is arranged between the spin-drying shaft 52 and the washing shaft 51, so that the spin-drying shaft 52 and the washing shaft 51 may rotate relatively, and a plurality of washing shaft oil bearings 80 may be arranged and are arranged at different positions, to ensure more stable relative rotation of the spin-drying shaft 52 and the washing shaft 51.

The washing machine driving means further includes a gear reducer 200, which includes an input gear shaft 31, a first gear 321, a second gear 322, an intermediate gear 331 and an output gear 332. The input gear shaft 31 is inserted into the axle hole of the motor rotor 23, and an oil bearing (not shown in the figure) is arranged between the input gear shaft 31 and the motor rotor 23. The input gear shaft 31 and the motor rotor 23 may rotate relatively via the oil bearing. The first gear 321 and the second gear 322 are fixedly mounted at the opposite ends of the input gear shaft 31. The first gear 321 is engaged with the intermediate gear 331, the second gear 322 is engaged with the output gear 332, and both the intermediate gear 331 and the output gear 332 are inner gear rings.

The intermediate gear 331 is fixedly connected with an end of the spin-drying shaft 52. The fixed connection may be a spline fastening and sleeving connection, a screw fastening connection or other fixed connections. The output gear 332 is fixedly connected with the washing shaft 51. Preferably, the output gear 332 is an injection molded part and is specifically obtained by injection molding on a connecting sleeve 90. The connecting sleeve 90 may be connected with the washing shaft 51 in a spline fastening and sleeving manner, in a screw fastening connection manner or in other fixed connection manners.

It should be noted herein that, the rotor of the motor 100 may include a plurality of axle holes. Namely, a plurality of input gear shafts and first gears and second gears matched with the same may be inserted into the rotor of the motor 100. The plurality of input gear shafts may be arranged to ensure better stability and prolong the service life, when a combination of the motor 100 and the gear reducer 200 is at work.

The washing machine driving means further includes a clutch mechanism 4, which is arranged between the spin-drying shaft 52 and the motor rotor 23 to switch between the washing operation condition and the spin-drying operation condition.

The electromagnetic coil mechanism includes an electromagnetic coil 42 and a clutch gear ring 41. The electromagnetic coil 42 may be located inside or outside the clutch gear ring. The electromagnetic coil 42 may include a coil, a coil holder, a coil retaining frame and a clutch cover plate (not specifically shown or indicated in the figures). The coil is twisted on the coil holder. The coil holder is located on the coil retaining frame. The clutch cover plate is located above the coil retaining frame and fixed on the stator mounting disk 221 after being connected with the coil retaining frame. The clutch gear ring 41 is sleeved on the intermediate gear 331, and the clutch gear ring 41 and the intermediate gear 331 are engaged in axial slidable connection. It should be noted herein that, engagement teeth are arranged between the inner side of the clutch gear ring 41 and the outer side of the intermediate gear 331. The clutch gear ring 41 and the intermediate gear 331 are engaged at any operation condition and cannot rotate relatively. The coil retaining frame, the clutch cover plate and the clutch gear ring 41 comprise a magnetic conducting material. A closed magnetic circuit is formed between the three parts. Namely, a magnetic field is formed. Furthermore, when the stator mounting disk 221 is made of the magnetic conducting material, the stator mounting disk 221 may become the clutch cover plate at the same time; and when the stator mounting disk 221 is made of the magnetic conducting material, the clutch cover plate is fixedly connected to the stator mounting disk 221. Preferably, a spring (not shown in the figures) is fixedly connected to an upper end part of the clutch gear ring 41.

After being energized, the electromagnetic clutch mechanism generates the magnetic field, the clutch gear ring 41 may overcome the elastic force of the spring to slide upwards along the axial direction of the intermediate gear 331, so as to disconnect the clutch gear ring 41 with the motor rotor 23. At this time, after being energized, the motor 100 may achieve the lower speed output of the washing shaft 51 through the gear reducer 200, so as to fulfill the washing function.

It should be noted that, the common output and hybrid power (also called constant power) output may be achieved by changing the fixing manner of the clutch mechanism 4.

Specifically, when the clutch gear ring 41 is disconnected with the motor rotor 23, the clutch gear ring 41 is clutched with the stator mounting disk 221. At this time, the intermediate gear 331 connected with the clutch gear ring 41 and the spin-drying shaft 52 are in a fixed state, so that at the washing operation condition, only the lower speed output of the washing shaft 51 is common washing output, which is also called a single drive manner of the washing machine. When the clutch gear ring 41 is disconnected and is unfixed with the motor rotor 23, the unfixed herein refers to that the clutch gear ring 41 is not clutched with any part in the fixed state. Namely, the intermediate gear 331 connected with the clutch gear ring 41 and the spin-drying shaft 52 are in the unfixed state as well. At this time, the washing shaft 51 achieves a lower speed output, and the spin-drying shaft 52 also achieves lower speed output at a certain speed ratio, namely may achieve hybrid power output, which is also called a constant power drive manner of the washing machine. It should be noted herein that, the washing shaft 51 and the spin-drying shaft 52 may achieve a unidirectional lower speed output or an opposite bidirectional lower speed output. The rotating directions of the washing shaft 51 and the spin-drying shaft 52 are the same or reverse, which depends on a positive or negative value of a tooth difference ratio of the gear reduction mechanism. In practice, the tooth difference relationship of the gear reduction mechanism may be set according to demands.

Further specifically, when the clutch gear ring 41 is not fixed at the washing operation condition, and when the embodied washing machine is a washing machine having impeller 400 or a stirring washing machine, which includes a stirrer (an impeller 400 is a kind of the stirrer) and an inner tub 500. The washing manner is as follows. The stirrer and the inner tub 500 are respectively connected with the power output ends of the gear reducer 200. The washing machine switches between washing and spin-drying operation conditions by means of the clutch mechanism. The stirrer and the inner tub 500 rotate in the two opposite directions at the washing operation condition, and the stirrer and the inner tub 500 rotate in a same direction at the spin-drying operation condition. At the washing operation condition, the inner tub 500 and the stirrer randomly determine a rotational speed ratio instantly according to a resistance distribution relation and rotate in the two opposite directions at the rotational speed ratio. The rotational speed ratio is variable.

Further specifically, when the clutch gear ring 41 is fixed at the washing operation condition, and when the embodied washing machine is a washing machine having impeller 400 or a stirring washing machine, which includes a stirrer (an impeller 400 is a kind of the stirrer) and an inner tub 500. The washing manner is as follows. The stirrer and the inner tub 500 are respectively connected with the power output ends of the gear reducer 200. The washing machine switches between the washing and spin-drying operation conditions by means of the clutch mechanism 4. At the washing operation condition, the inner tub 500 is fixed and the stirrer rotates, and at the spin-drying operation condition, the stirrer and the inner tub 500 rotate in a same direction.

As mentioned above, when the embodied washing machine is a drum type washing machine, which includes a drum 600 and an inner tub 500. The washing manner is as follows. The drum 600 and the inner tub 500 are respectively connected with the power output ends of the gear reducer 200. The washing machine switches between the washing and spin-drying operation conditions through the clutch mechanism. The drum 600 and the inner tub 500 rotate in the two opposite directions at the washing operation condition, and the drum 600 and the inner tub 500 rotate in a same direction at the spin-drying operation condition. At the washing operation condition, the inner tub 500 and the drum 600 randomly determine a rotational speed ratio instantly according to a resistance distribution relation and rotate in the two opposite directions at the rotational speed ratio. The rotational speed ratio is variable.

As mentioned above again, when the embodied washing machine is a drum type washing machine, the drum type washing machine includes a drum 600 and an inner tub 500, and the washing manner is as follows. The drum 600 and the inner tub 500 are respectively connected with the power output ends of the gear reducer 200. The washing machine switches between the washing and spin-drying operation conditions through the clutch mechanism. At the washing operation condition, the inner tub 500 is fixed and the drum 600 rotates, and at the spin-drying operation condition, the drum 600 and the inner tub 500 rotate in a same direction.

After the electromagnetic clutch mechanism is de-energized, the magnetic field disappears, under the action of the elastic force of the spring, the clutch gear ring 41 slides downwards along the axial direction of the intermediate gear 331 to clutch the clutch gear ring 41 with the motor rotor 23. Since no relative rotation is generated between the clutch gear ring 41 and the intermediate gear 331, at this time, the intermediate gear 331, the spin-drying shaft 52 connected with the intermediate gear 331 and the motor rotor 23 are locked, resulting in that the gear reducer 200 locks itself, and the washing shaft 51, the gear reducer 200, the spin-drying shaft 52 and the motor rotor 23 rotate at the same rotational speed to fulfill the spin-drying function.

For an illustration of a specific structure of the clutch gear ring 41, please refer to related literal description for the clutch gear ring in the previous patent application numbered CN201210084877.4 in the name of the present applicant.

An upper slot part (not shown in the figures) and a lower slot part (231*b*) which are fixed and clutched with upper insertion teeth and lower insertion teeth of the clutch gear ring 41 are respectively arranged on the stator mounting disk 221 and the motor rotor 23.

It should be still noted herein that, when the motor stator 22 is fixedly connected with the mounting plate 26 directly, the connection relation of the above-mentioned electromagnetic clutch mechanism and the stator mounting disk 221 is completely replaced by the connection relation of the electromagnetic clutch mechanism and the mounting plate 26.

Meanwhile, it should be noted that, for the stator mounting disk 221, the mounting plate 26, the upper slot and other structures in the present invention, please also refer to the structural design of the previous patent application numbered CN201210084877.4 in the name of the present applicant. Similarly, a bearing housing and the like may also be fixedly arranged on the mounting plate 26 according to actual demands.

According to the demand of a mounting structure in the present invention, the clutch gear ring 41 may also be engaged in axial slidable connection with the spin-drying shaft 52 via a spline (specifically a spline sleeve), and the function and effect thereof are essentially identical with those of the above-mentioned clutch gear ring 41 and the intermediate gear 331.

It should be still noted herein that, the clutch mechanism 4 may also be arranged between other transmission members of the gear reducer 200 and the motor rotor 23 or directly arranged between the transmission members of the gear reducer 200 for clutching or disconnecting to switch between the washing operation condition and the spin-drying operation condition. The clutch mechanism 4 is arranged in any way as long as the washing operation condition and the spin-drying operation condition of the washing machine could be switched.

At the spin-drying operation condition, the spin-drying shaft 52 bears the weights of the washings, in order to limit the axial movement of the spin-drying shaft 52. A plain bearing, a flat gasket and an elastic retainer ring (not shown in the figures) may be arranged between the spin-drying shaft 52 and the intermediate gear 331 to limit the movement of the spin-drying shaft 52 in an axial direction thereof, and meanwhile, bearing snap springs or bearing gaskets may also be arranged on different positions of the spin-drying shaft 52 to fulfill the weight bearing function for the spin-drying shaft 52.

In order that the washing shaft 51 and the spin-drying shaft 52 may rotate more stably at the spin-drying operation condition, a first bearing 831 is arranged between the spin-drying shaft 52 and the mounting plate 26, and a second bearing 832 is arranged between the spin-drying shaft 52 and the stator mounting disk 221.

Furthermore, a first water seal (not shown in the figures), also called a small water seal, is arranged between the washing shaft 51 and the spin-drying shaft 52, a second water seal, also called a large water seal 60, is arranged between the spin-drying shaft 52 and the mounting plate 26 for preventing washing water from entering the washing machine driving means in a operation process of the washing machine.

The clutch mechanism 4 in the above embodiments is an electromagnetic clutch mechanism. Of course, it may be a mechanical clutch mechanism in common general knowledge, and those skilled in the art may replace the electromagnetic clutch mechanism with the mechanical clutch mechanism based on the present invention without any inventive efforts.

The bearing, the snap spring, the gasket, the elastic retainer ring, the plain bearing, the washer, the sealing ring and other structures for establishing the connecting, weight bearing, axial and radial limitation and sealing functions of the parts in the above-mentioned embodiments are common means to those skilled in the art. These structures might be incompletely disclosed in the embodiments of the present invention, but it is believed that these have no novelty or inventive steps. Of course, for specific settings, please also directly refer to character description in the previous patent application numbered CN201210084877.4 in the name of the present applicant.

Meanwhile, the gear reducers 200 in the above embodiments are NN type gear reducers 200 with small tooth difference, so that a larger transmission ratio may be obtained in the present invention, of course, the gear reducer 200 may also be an NGW gear reducer 200 according to actual demand, specifically: the intermediate gear is an inner gear ring, the gear reducer includes the intermediate gear, an input gear and an output gear, which are engaged in sequence, the intermediate gear may be relatively rotatably sleeved on the output shaft, and the input gear is an outer gear and is sleeved on an output gear shaft. For the remaining relevant structures of the embodiment, please refer to any one of the remaining embodiments.

Figure 16:
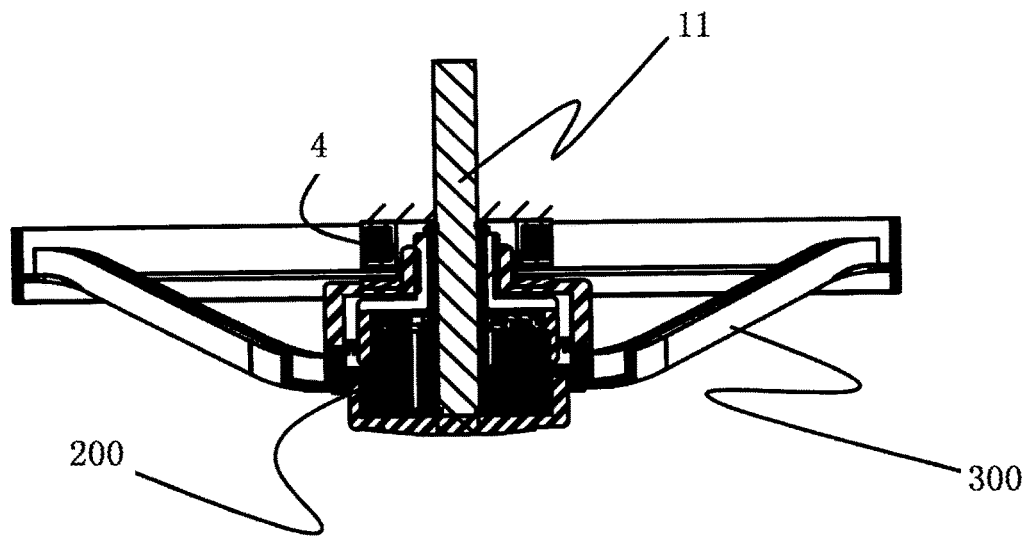
FIG. 16 is a schematic structural perspective view of an embodiment of a belt pulley with a gear reducer of the present invention.

With reference to FIG. 16, when the power source is a motor 100 that outputs power via a belt pulley 300, the belt pulley 300 is used as a rotator of the power source to obtain the belt pulley 300 with the gear reducer 200. The input gear of the gear reducer 200 may rotate relative to the belt pulley 300 via an input gear shaft and is eccentrically mounted on the belt pulley 300. The output gear of the gear reducer 200 is fixedly connected with the output shaft. For other relevant structures, please refer to related description in any embodiment as shown in FIG. 1 to FIG. 9.

When the belt pulley 300 with the gear reducer 200 as shown in FIG. 16 is used as a washing machine driving means in a washing machine, for specific relevant structures, please refer to relevant embodiments applying the ninth embodiment of the motor with the gear reducer of the present invention as the washing machine driving means in the field of washing machines, as shown in FIG. 10.

For the embodiments of the gear reducer 200 in the present invention, please specifically refer to each embodiment of the motor with the gear reducer, and they will not be repeated redundantly herein.

Figure 17:
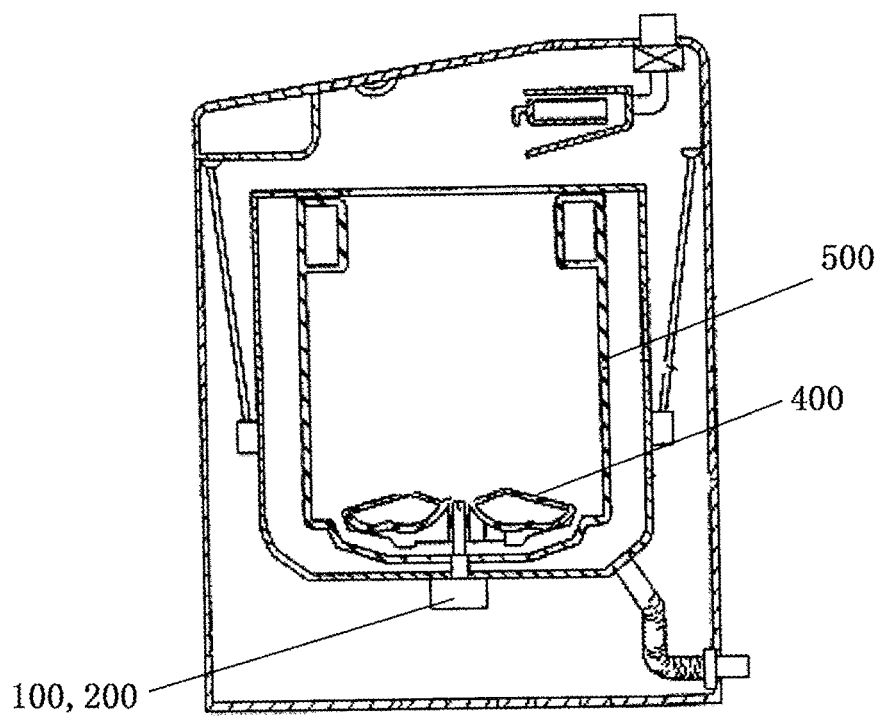
FIG. 17 is a structural diagram of a first embodiment of a washing machine of the present invention.

With reference to FIG. 17, a washing machine includes an inner tub 500, an impeller 400, a gear reducer 200, a power source and a clutch mechanism 4, wherein the power source is a motor 100, an output shaft of the gear reducer 200 is fixedly connected with the impeller 400, the output shaft sleeve of the gear reducer 200 is fixedly connected with the inner tub 500, the rotor of the motor 100 is used as a rotator of the power source and connected with the power input end of the gear reducer 200, and the clutch mechanism 4 switches between engagement and disengagement positions to achieve power transmission or lock of parts of the gear reducer 200. For the remaining relevant parts, please refer to any other embodiments.

Figure 18:
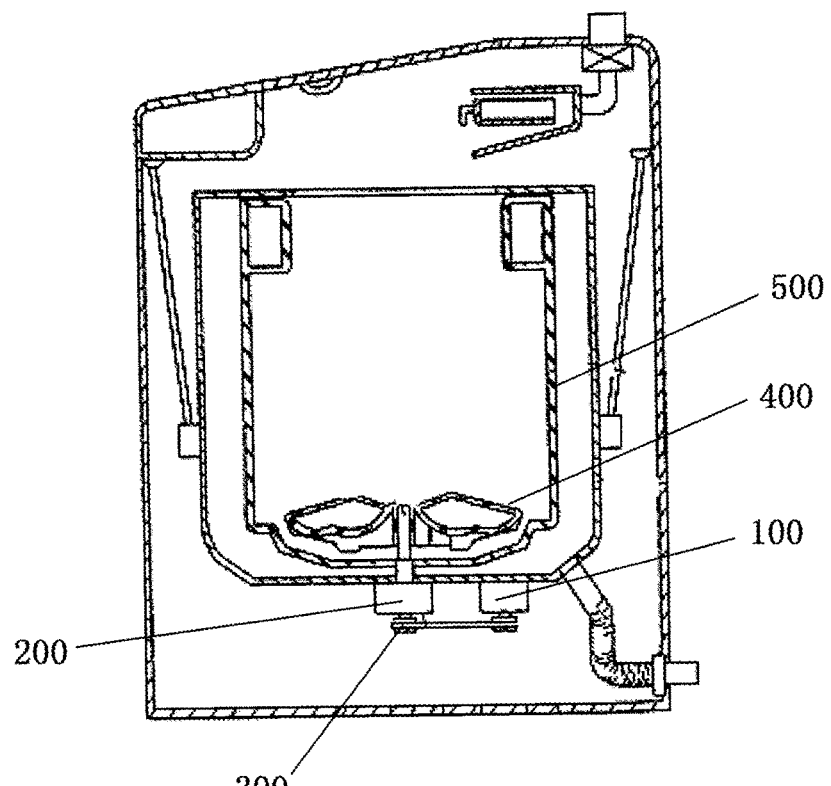
FIG. 18 is a structural diagram of a second embodiment of a washing machine of the present invention.

With reference to FIG. 18, a washing machine includes an inner tub 500, an impeller 400, a gear reducer 200, a power source and a clutch mechanism 4, wherein: the power source is a motor 100 which outputs through a belt pulley 300, the output shaft of the gear reducer 200 is fixedly connected with the impeller 400, the output shaft sleeve of the gear reducer 200 is fixedly connected with the inner tub 500, the belt pulley 300 connected with the motor 100 is used as a rotator of the power source and connected with the power input end of the gear reducer 200, and the clutch mechanism 4 switches between engagement and disengagement positions to achieve power transmission or lock of parts of the gear reducer 200. For the remaining relevant parts, please refer to any other embodiments.

Figure 19:
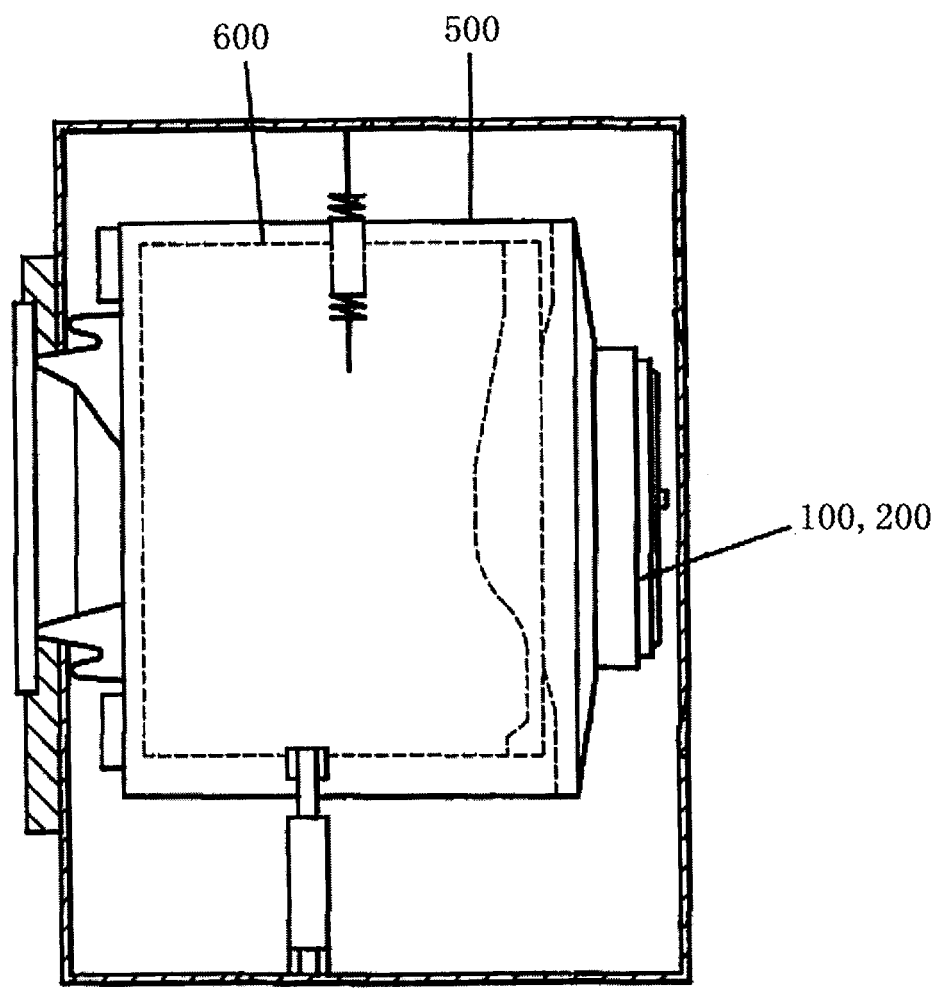
FIG. 19 is a structural diagram of a third embodiment of a washing machine of the present invention.

With reference to FIG. 19, a washing machine includes an inner tub 500, a drum 600, a gear reducer 200, a power source and a clutch mechanism 4, wherein the power source is a motor 100, the output shaft of the gear reducer 200 is fixedly connected with the drum 600, the output shaft sleeve of the gear reducer 200 is fixedly connected with the inner tub 500, the rotor of the motor 100 is used as a rotator of the power source and connected with the power input end of the gear reducer 200, and the clutch mechanism 4 switches between engagement and disengagement positions to achieve power transmission or lock of parts of the gear reducer 200. For the remaining relevant parts, please refer to any other embodiments.

Figure 20:
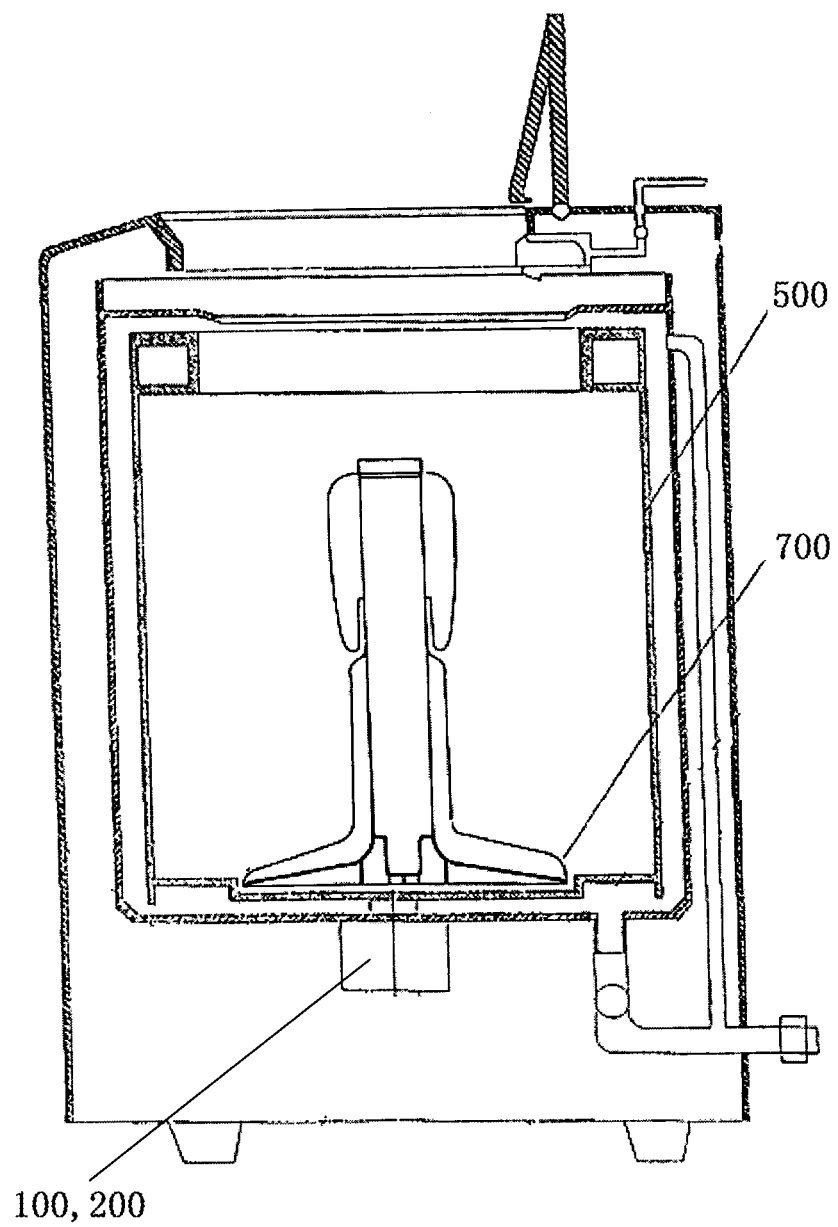
FIG. 20 is a structural diagram of a fourth embodiment of a washing machine of the present invention.

With reference to FIG. 20, a washing machine includes an inner tub 500, a stirrer 700, a gear reducer 200, a power source and a clutch mechanism 4, wherein the power source is a motor 100, the output shaft of the gear reducer 200 is fixedly connected with the stirrer 700, the output shaft sleeve of the gear reducer 200 is fixedly connected with the inner tub 500, the rotor of the motor 100 is used as a rotator of the power source and connected with the power input end of the gear reducer 200, and the clutch mechanism 4 switches between engagement and disengagement positions to achieve power transmission or lock of parts of the gear reducer 200. For the remaining relevant parts, please refer to any other embodiments.

To sum up, a washing machine driving mechanism of the present invention includes: a shaftless rotator 23 for generating rotational energy; a gear reduction mechanism 200 mounted on the rotator 23 and configured to obtain rotational energy from an eccentric position of the rotator 23 and output the energy with or without speed reduction; and a first driving part (for example, the output shaft 11 as shown in FIG. 1 to FIG. 12) connected with the gear reduction mechanism and configured to supply the rotational energy with or without the speed reduction to a respective execution part of a washing machine. With reference to FIG. 1 to FIG. 12 and FIG. 17 to FIG. 19.

The respective execution part of the washing machine may be a same execution part capable of executing both washing and spin-drying operations, for example, a washing machine drum, or it may be an impeller or a stirrer which only executes the washing operation.

With reference to FIG. 1 to FIG. 12, the gear reduction mechanism 200 of the present invention includes: an input gear shaft 31 mounted at said position eccentric from an axis of the rotator 23 and configured to revolve around said axis while the rotator rotates, so as to obtain the rotational energy therefrom; an input gear in a small diameter connected with the input gear shaft and rotating relative to the rotator 23; and an output gear 332 in a larger diameter engaged with the input gear.

The first driving part of the present invention is an output shaft 11 which is fixedly connected to the center of the output gear 332.

The washing machine driving mechanism of the present invention further includes a second driving part configured specially to output the rotational energy without speed reduction, and the second driving part is an output shaft sleeve 12 which is sleeved on the output shaft 11 and axially slidable. The second driving part is generally applied to a washing machine which needs to adopt two execution parts for respectively washing and spin-drying. For this type of washing machine, the first driving part is connected with the impeller or stirrer of the washing machine, and the second driving part is connected with the inner tub of the washing machine.

The gear reduction mechanism of the present invention further includes an intermediate driving gear 331 which is located outside the rotator 23 and engaged with the input gear, and an axial center of the intermediate driving gear 331 is fixedly connected with the output shaft sleeve 12. The intermediate driving gear 331 at least has two functions. One function is to drive the output shaft sleeve 12 to drive the inner tub of the washing machine to rotate according to the rotational speed of the rotator 23 by means of the clutching of the clutch device 4 engaged with the same on the rotator 23; the other function is to drive the input gear to rotate relative to the rotator 23 when the clutch device 4 engaged with the same deviates from the rotator 23. That is, the intermediate driving gear may force the input gear to rotate relative to the rotator 23, when the input gear rotates with the rotation of the input gear shaft 31.

With reference to FIG. 1 to FIG. 12, an eccentric through hole for mounting the output shaft 11 is formed in the axial center of the rotator 23, and the output shaft 11 is rotatably mounted in the eccentric through hole of the rotator 23.

See embodiments as shown in FIG. 1, FIG. 3, FIG. 4, FIG. 5, FIG. 8 and FIG. 9. An eccentric through hole for mounting the input gear shaft 31 is formed in the position eccentric from the axis of the rotator 23, into which the input gear shaft 31 is rotatably mounted. The opposite ends of the input gear shaft respectively extend out from the eccentric through hole. In these embodiments, the input gear includes a first input gear 321 fixedly connected with an end of the input gear shaft 31, and a second input gear 322 fixedly connected with an opposite end of the input gear shaft 31 and engaged with the output gear 332.

See embodiments as shown in FIG. 1, FIG. 3, FIG. 4, FIG. 5, FIG. 8 and FIG. 9. The intermediate driving gear is an intermediate gear 331 which is engaged with the first input gear 321 and is sleeved on the output shaft sleeve 12. The working principle thereof is that, by means of the axial slide of the clutch device 4, the intermediate gear 331 is in a state of not revolving around the axial center of the rotator, to drive the first input gear 321 that revolves around the axial center of the rotator to rotate, so as to drive the input gear shaft 31 and the second input gear 322 to rotate.

More specifically, since the intermediate gear 331 does not revolve, while the first input gear 321 is driven by the input gear shaft 31 to revolve around the axial center of the rotator, an interaction force is generated between the engaged intermediate gear 331 and first input gear 321, so as to promote the first input gear 321 to rotate relative to the rotator to drive the input gear shaft 31 and the second input gear 322 to rotate.

See embodiments as shown in FIG. 2, FIG. 6 and FIG. 7. An end of the input gear shaft 31 of the present invention may also be fixedly connected to a position eccentric from the axis of the rotator 23. At this time, the input gear includes a first input gear 321 and a second input gear 322 which are fixedly connected with each other. The first input gear 321 and the second input gear 322 may be a duplex gear.

In addition, as shown in FIG. 2, FIG. 6 and FIG. 7, axial centers of the first input gear 321 and the second input gear 322 are rotationally connected with an opposite end of the input gear shaft 31 respectively. The second input gear 322 is engaged with the output gear 332.

As shown in FIG. 1 to FIG. 12, the gear reduction mechanism of the present invention further includes a clutch device 4 engaged with the intermediate gear 311. When the clutch device 4 axially slides to clutch the rotator 23, the output shaft sleeve 12 is driven by the intermediate gear 311 to rotate according to the rotational speed of the rotator 23.

In the embodiments as shown in FIG. 2, FIG. 6 and FIG. 7, the intermediate driving gear is an intermediate gear 331 which is engaged with the first input gear 321 and sleeved on the output shaft sleeve 12.

As mentioned above, by means of the axial sliding of the clutch device 4, the intermediate gear 331 may be disposed in a state of not revolving around the axial center of the rotator, to drive the first input gear 321 that revolves around the axial center of the rotator to rotate so as to drive the second input gear 322 to rotate.

On the other hand, in the embodiments as shown in FIG. 2, FIG. 6 and FIG. 7, an end of the input gear shaft 31 is rotationally connected to a position eccentric from the axis of the rotator. At this time, the input gear includes a duplex gear which is fixedly connected with an opposite end of the input gear shaft 31 and which is provided with a first input gear 321 and a second input gear 322. The second input gear 322 is engaged with the output gear 332. The first input gear 321 is engaged with and sleeved on the intermediate gear 331 on the output shaft sleeve 12 to enable the first input gear 321 to be rotated by the interaction with the intermediate gear.

As mentioned above, by means of the axial sliding of the clutch device 4, the intermediate gear 331 is disposed in a state of not revolving around the axial center of the rotator, to drive the first input gear 321 that revolves around the axial center of the rotator to rotate so as to drive the second input gear 322 and the input gear shaft 31 to rotate.

In the present invention, the intermediate gear 331 is engaged with the clutch device 4. The clutch device 4 may be sleeved on the output shaft sleeve 12 in an axial slidable manner, and the clutch device 4 is clutched with the rotator 23 or unclutched with the rotator 23 by means of the axial sliding.

Specifically, in the present invention, the clutch gear ring 41 of the clutch device 4 engaged with the intermediate gear 331 may be urged to axially slide in a positive direction to release the clutch gear ring 41 of the clutch device 4 from the rotator 23, so as to prevent the intermediate gear 331 from entering into the state of not revolving around the axial center of the rotator to output the rotational energy of the rotator at a lower speed. That is, when the clutch gear ring 41 of the clutch device 4 is released from the rotator 23, the intermediate gear 331 is disengaged from the rotator 23 to enter into the state of not revolving around the axial center of the rotator 23, resulting in that the first input gear rotates to drive the second gear to rotate so as to enable the output shaft 11 to output the rotational energy of the rotator at a lower speed.

In the present invention, the clutch gear ring 41 engaged with the intermediate gear 331 may be urged to axially slide in a reverse direction to force the clutch gear ring 41 of the clutch device 4 to clutch the rotator 23, so as to drive the intermediate gear 331 to enter into a state of revolving around the axial center of the rotator to output the rotational energy of the rotator at a higher speed. That is, when the clutch device 4 is clutched with the rotator 23, the intermediate gear 331 is combined with the rotator 23 to force the intermediate gear 331 to enter into the state of revolving around the axial center of the rotator, resulting in that the intermediate gear 331 loses the acting force of driving the first input gear 321 to rotate, such that the first output gear and the second input gear stop rotating, and thus the output shaft 11 outputs the rotational energy of the rotator at a higher speed.

The present invention has been described above in detail. Herein, specific examples are used for illustrating the concepts and embodiments of the present invention, and the illustration of the above embodiments only aims to help understand the method of the present invention and the core idea therefore. It should be noted that, those of ordinary skill in the art may also make a variety of improvements and modifications to the present invention on the premise of not departing from the principle of the present invention, and these improvements and modifications also fall within the protection scope of the claims of the present invention.

The invention claimed is:

1. A washing machine driving mechanism, comprising:
   a rotator for generating rotational energy;
   a gear reduction mechanism mounted on the rotator and configured to obtain rotational energy from an eccentric position of the rotator and output the energy with or without speed reduction;
   a first driving part connected with the gear reduction mechanism and configured to supply the rotational energy with or without the speed reduction to respective execution parts of the washing machine; and
   a second driving part configured for outputting the rotational energy without speed reduction, wherein the second driving part is an output shaft sleeve which is sleeved on the output shaft and axially slidable;
   wherein the gear reduction mechanism comprises:
      an input gear shaft mounted at said position eccentric from an axis of a rotator and configured to revolve around said axis while the rotator rotates, so as to obtain the rotational energy therefrom;
      an input gear connected with the input gear shaft and rotatable relative to the rotator; and
      an output gear engaged with the input gear;
      wherein an output shaft serving as the first driving part is fixedly connected to the center of the output gear; and
   wherein the gear reduction mechanism further comprises an intermediate driving gear which is located outside of the rotator and engaged with the input gear, and wherein the intermediate driving gear is fixedly connected at its axial center with the output shaft sleeve.

2. A washing machine driving mechanism of claim 1, wherein an eccentric through hole for mounting the input gear shaft is formed in the position deviating from the axis of the rotator, and the input gear shaft is rotatably mounted in the eccentric through hole.

3. A washing machine driving mechanism of claim 1, wherein the input gear comprises:
   a first input gear fixedly connected with an end of the input gear shaft; and
   a second input gear fixedly connected with an opposite end of the input gear shaft, the second input gear being engaged with the output gear.

4. A washing machine driving mechanism of claim 1, wherein an end of the input gear shaft is fixedly or rotationally connected to said position eccentric from the axis of the rotator.

5. A washing machine driving mechanism of claim 4, wherein the input gear comprises a first input gear and a second input gear that are fixedly connected with each other,
   wherein the axial centers of the first input gear and the second input gear are rotationally or fixedly connected with an opposite end of the input gear shaft respectively;
   wherein the second input gear is engaged with the output gear.

6. A washing machine driving mechanism of claim 5, wherein the intermediate driving gear is an intermediate gear which is engaged with the first input gear and is sleeved on the output shaft, and wherein the intermediate driving gear is configured to drive the first input gear to rotate through the interaction with the intermediate gear.

7. A washing machine driving mechanism of claim 6, wherein the gear reduction mechanism further comprises a clutch device engaged with the intermediate gear, and when the clutch device axially slides to clutch the rotator, the output shaft sleeve is driven by the intermediate gear to rotate according to the rotational speed of the rotator.

* * * * *

UNITED STATES PATENT AND TRADEMARK OFFICE
CERTIFICATE OF CORRECTION

PATENT NO. : 9,850,616 B2
APPLICATION NO. : 14/783834
DATED : December 26, 2017
INVENTOR(S) : Xiaohui Liu, Yiming Hu and Chang Chen It is certified that error appears in the above-identified patent and that said Letters Patent is hereby corrected as shown below:

On the Title Page

Item (73) Assignee: Please correct to read -- CHANGZHOU SINYA ELECTROMOTOR CO., LTD. --

Signed and Sealed this
Sixteenth Day of July, 2019

Andrei Iancu
*Director of the United States Patent and Trademark Office*